(12) United States Patent
Wang et al.

(10) Patent No.: US 12,007,583 B2
(45) Date of Patent: Jun. 11, 2024

(54) LENS, CAMERA MODULE AND MANUFACTURING METHOD THEREOF

(71) Applicant: NINGBO SUNNY OPOTECH CO., LTD., Yuyao (CN)

(72) Inventors: Mingzhu Wang, Yuyao (CN); Bojie Zhao, Yuyao (CN); Chunmei Liu, Yuyao (CN); Feifan Chen, Yuyao (CN); Zhenyu Chen, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 0 days.

(21) Appl. No.: 18/074,882

(22) Filed: Dec. 5, 2022

(65) Prior Publication Data

US 2023/0161082 A1    May 25, 2023

Related U.S. Application Data

(62) Division of application No. 16/479,403, filed as application No. PCT/CN2018/074319 on Jan. 26, 2018, now Pat. No. 11,579,341.

(30) Foreign Application Priority Data

Jan. 26, 2017   (CN) ......................... 201710057589.2
Jan. 26, 2017   (CN) ......................... 201720107077.8

(51) Int. Cl.
  *G02B 3/00*     (2006.01)
  *G02B 13/00*    (2006.01)
  (Continued)

(52) U.S. Cl.
  CPC ............. *G02B 3/00* (2013.01); *G02B 13/004* (2013.01); *H04N 23/54* (2023.01); *H04N 23/55* (2023.01); *G02B 2003/0093* (2013.01)

(58) Field of Classification Search
  None
  See application file for complete search history.

(56) References Cited

U.S. PATENT DOCUMENTS 5,905,599 A    5/1999  Nomura et al.
6,288,849 B1   9/2001  Teramoto
(Continued)

FOREIGN PATENT DOCUMENTS

CN    101872051 A    10/2010
CN    102236150 A    11/2011
(Continued)

OTHER PUBLICATIONS

Extended European Search Report for European Application No. 18744975.6, dated Dec. 11, 2020.
(Continued)

*Primary Examiner* — Darryl J Collins
(74) *Attorney, Agent, or Firm* — Birch, Stewart, Kolasch & Birch, LLP

(57) ABSTRACT

A lens (10) and a camera module (100) and a manufacturing method thereof, wherein the lens (10) comprises an edge-cut lens sheet (114), wherein the edge-cut lens sheet (14) includes at least one chord edge (1141) and at least one circular edge (1142), wherein the chord edge (1141) and the circular edge (1142) are adjacently connected to each other, and wherein the chord edge (1141) and the circular edge (1142) have different curvatures, so that the lens sheet (114) becomes narrow and the width of the lens (10) become narrow, to form an ultra-narrow camera module (100).

20 Claims, 25 Drawing Sheets

(51) Int. Cl.
*H04N 23/54* (2023.01)
*H04N 23/55* (2023.01)

(56) References Cited

U.S. PATENT DOCUMENTS

| | | | |
|---|---|---|---|
| 9,341,813 | B1 | 5/2016 | Lin et al. |
| 2004/0169939 | A1 | 9/2004 | Sawagami et al. |
| 2006/0158748 | A1 | 7/2006 | Hirata et al. |
| 2008/0079829 | A1 | 4/2008 | Choi et al. |
| 2009/0168204 | A1 | 7/2009 | Nishizawa et al. |
| 2010/0025793 | A1 | 2/2010 | Chang et al. |
| 2012/0182624 | A1 | 7/2012 | Itou et al. |
| 2012/0224267 | A1 | 9/2012 | Kikuchi et al. |
| 2013/0050854 | A1 | 2/2013 | Azuma et al. |
| 2015/0309217 | A1 | 10/2015 | Castro et al. |
| 2016/0134813 | A1* | 5/2016 | Hu ............... H04N 23/687 348/208.11 |
| 2016/0139359 | A1 | 5/2016 | Lin et al. |
| 2017/0235095 | A1 | 8/2017 | Sekimoto et al. |

FOREIGN PATENT DOCUMENTS

| | | |
|---|---|---|
| CN | 204359995 U | 5/2015 |
| CN | 205792878 U | 12/2016 |
| CN | 105445889 A | 3/2018 |
| EP | 1 560 054 A1 | 8/2005 |
| JP | 11-352374 A | 12/1999 |
| JP | 2004-264538 A | 9/2004 |
| JP | 2014-194585 A | 10/2014 |
| JP | 2015-72388 A | 4/2015 |
| KR | 10-2016-0009390 A | 1/2016 |
| KR | 10-2016-0046785 A | 4/2016 |
| TW | M521747 U | 5/2016 |
| WO | WO 2016/067731 A1 | 5/2016 |

OTHER PUBLICATIONS

International Search Report for PCT/CN2018/074319 dated May 4, 2018.
Partial Supplementary European Search Report for European Application No. 18744975.6, dated Sep. 22, 2020.
European Office Action dated Jul. 5, 2023 for Application No. 18 744 975.6.

* cited by examiner

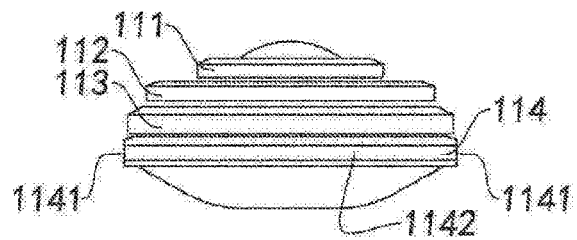
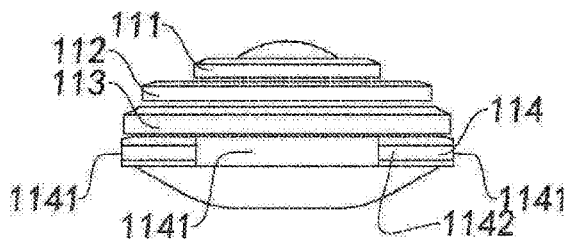
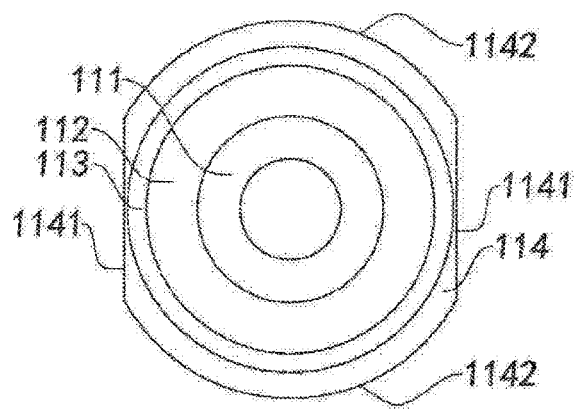
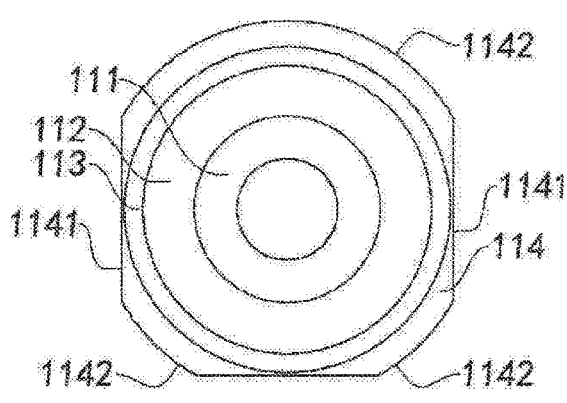
Fig.7                              Fig.8
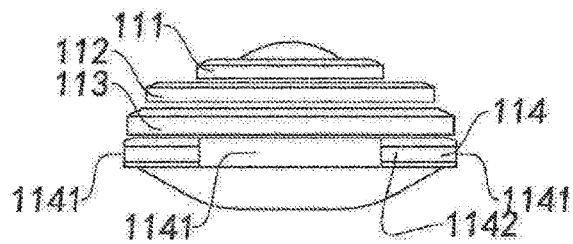
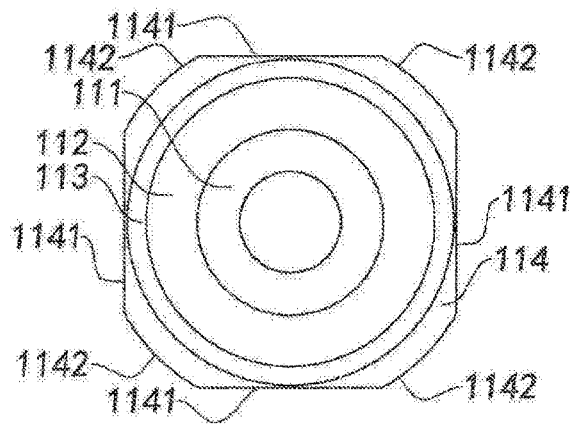
Fig.9

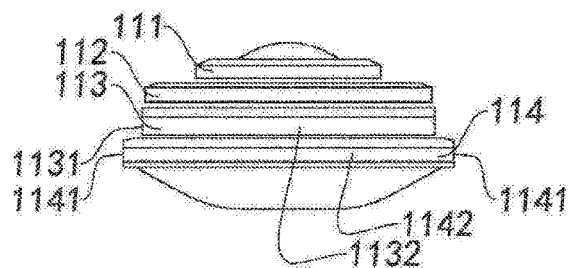
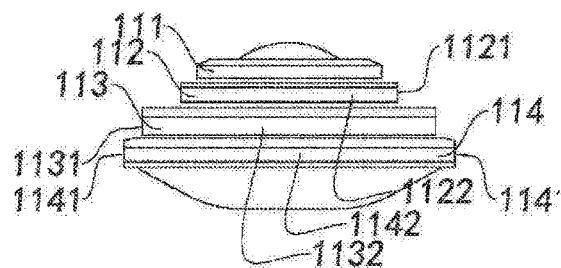
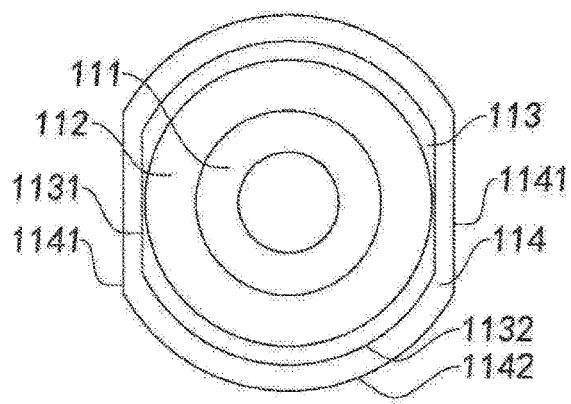
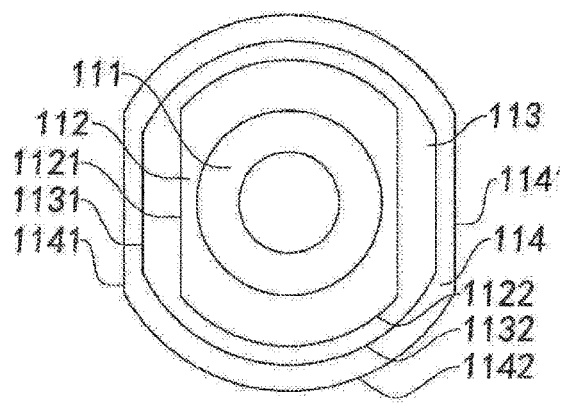
Fig.10　　　　　　　　　　Fig.11

LENS, CAMERA MODULE AND MANUFACTURING METHOD THEREOF

CROSS REFERENCE TO RELATED APPLICATIONS

This application is a Divisional of copending U.S. application Ser. No. 16/479,403, filed on Jul. 19, 2019, which is the National Phase under 35 U.S.C. § 371 of International Application No. PCT/CN2018/074319, filed on Jan. 26, 2018, which claims priority under 35 U.S.C. § 119(a) to and benefit of Chinese Patent Application No. 201710057589.2, entitled "CAMERA LENS AND METHOD FOR MANUFACTURING SAME, AND CAMERA MODULE", filed on Jan. 26, 2017, and Chinese Patent Application No. 201720107077.8, entitled "CAMERA LENS AND MODULE OF MAKING A VIDEO RECORDING", filed on Jan. 26, 2017. The above-referenced applications are incorporated into the present application by reference herein in their entirety.

TECHNICAL FIELD

The present invention relates to the field of camera modules, and further relates to a lens and a camera module and a manufacturing method thereof, in particular to an ultra-narrow lens and a camera module, wherein the body shape of the camera module is greatly reduced, which provides the convenience for a smart device to compactly use the camera module.

TECHNICAL BACKGROUND

With the development of smart devices, camera modules are already indispensable devices in the smart devices. Moreover, the high performance of the camera modules is a main direction for the improvement and development of smart devices, and is the key to the performance of smart devices.

At present, the conventional smart devices, such as smart phones, smart computers, smart homes, etc., need to leave very large spaces for the camera modules, especially need to provide wide edges for the camera modules when designing the frames. However, as the smart devices are seeking for the trend of a small size and a narrow bezel, the camera modules must also be reduced in volume. How to ensure the normal operation of the lens and the intact function of the camera module while reducing the volume is a problem that needs to be solved.

A conventional lens and a conventional camera module are as shown in FIG. 1. The conventional camera module includes at least one lens sheet 10P, a lens barrel 20P, a lens base 30P, and a circuit assembly 40P, wherein the lens sheet 10P is a round lens sheet, the lens barrel 20P has a cylindrical tubular structure, the lens base 30P has a square structure, and the circuit assembly 40P has a square shape. Herein, since the lens barrel 20P encloses and supports the lens sheet 10P, the outer shapes of the lens barrel 20P and the lens sheet 10P correspond to each other, that is, the lens sheet 22P and the lens barrel 20P are both a complete round shape when viewed from an axial direction. However, the lens base 30P and the circuit assembly 40P are both square, and a main photosensitive chip 41P in the circuit assembly 40P is also square. Each of the lens sheets 10 P has a round light-passing portion and a non-light-passing portion. Therefore, a lot of light is not received by the circuit assembly 40P, but falls on components having relatively smooth surfaces of the circuit assembly 40P, such as gold wires, pads, lines, lens bases, molded parts, glue, etc., and returns to an imaging region after multiple reflections to form stray light. Then, if it can be modified from the lens sheet 10P, unnecessary portions are reduced, so that the lens barrel 20P, the lens base 30P, and the circuit assembly 40P are correspondingly reduced in unnecessary portions, and the volume of the camera module may be reduced in the whole-body shape. Moreover, in practice, in an extreme case, as long as the circuit assembly 40P is slightly larger than the photosensitive chip, the lens barrel 20P has a size corresponding to the circuit assembly 40P, and the lens sheet 10P has a size corresponding to the photosensitive chip of the circuit assembly 40P, the complete function of the camera module can be ensured.

The conventional camera module leaves a lot of safety space for the circuit assembly 40P, especially for the photosensitive chip 41P to stably operate for a long time, and a lot of space is expanded in the circuit assembly 40P. Moreover, in order to ensure an effective clear aperture, the conventional lens sheet 10P uses a spacer or a light blocking plate to block unwanted light. However, the light may still be refracted and reflected on a portion of the lens sheet to form stray light.

The above factors not only decrease the imaging effect, but also cause many redundant portions existing in the overall body shape of the camera module. This is disadvantageous to a compact use environment and an application of a highly integrated system.

On the other hand, with the development of high pixel camera modules, the number of lens sheets of the lens is continuously increasing, for example, up to the number of lens sheets of 4p, 5p, 6p, 7p or more, and the volume of the lens is also continuously increasing. Therefore, the influence of the lens on the camera module is also becoming bigger and bigger, and the improvements to the lens also become more important.

SUMMARY OF THE INVENTION

It is an object of the present invention to provide a lens and a camera module and a manufacturing method thereof, which utilize a compact body shape, reduce an unnecessary volume, and are effectively applied in a smart device in the case of ensuring a complete function.

Another object of the present invention is to provide a lens and a camera module and a manufacturing method thereof, wherein the lens comprises at least one edge-cut lens sheet, wherein the edge-cut lens sheet has at least one chord edge, an imaging region and a non-imaging region, and the body shape of the edge-cut lens sheet will be reduced by the chord edge, but the imaging region of the edge-cut lens sheet will not be affected.

Another object of the present invention is to provide a lens and a camera module and a manufacturing method thereof, wherein the camera module further comprises an edge-cut lens barrel, a base and a circuit assembly, and wherein the edge-cut lens barrel and the base match with the body shape of the edge-cut lens sheet to effectively process light in the circuit assembly.

Another object of the present invention is to provide a lens and a camera module and a manufacturing method thereof, wherein the chord edge of the lens sheet reduces the influence from the non-imaging region while not affecting the imaging region.

Another object of the present invention is to provide a lens and a camera module and a manufacturing method thereof, wherein the edge-cut lens sheet further comprises at least one circular edge, and the difference in shape of the chord edge and the circular edge can decrease the difficulties in the assembly of the edge-cut lens sheet.

Another object of the present invention is to provide a lens and a camera module and a manufacturing method thereof, wherein the chord edge of the edge-cut lens sheet may be a straight line, or may be an arc, and with respect to the round shape of the circular edge, the chord edge may reduce time and cost spent in the processing and design of a mold, significantly reducing the use of materials.

Another object of the present invention is to provide a lens and a camera module and a manufacturing method thereof, wherein the corresponding processing yield of the chord edge of the edge-cut lens sheet is improved relative to the circular edge.

Another object of the present invention is to provide a lens and a camera module and a manufacturing method thereof, wherein the non-imaging region of the edge-cut lens sheet is much reduced relative to a conventional lens sheet, and the light passing through the non-imaging region is also reduced accordingly, and the imaging effect and imaging efficiency are improved.

Another object of the present invention is to provide a lens and a camera module and a manufacturing method thereof, wherein due to the reduction of the body shape of the edge-cut lens sheet, the edge-cut lens barrel, the base, and the circuit assembly are also correspondingly reduced in body shape, so that the overall body shape of the camera module is narrowed.

Another object of the present invention is to provide a lens and a camera module and a manufacturing method thereof, wherein due to the design of the chord edge of the edge-cut lens sheet, the edge-cut lens barrel and the base have corresponding chord edges portions in their shapes.

Another object of the present invention is to provide a lens and a camera module and a manufacturing method thereof, wherein the position of the chord edge portion of the edge-cut lens barrel corresponding to the base may be linear or arc, and in order to manufacture the chord edge portion of the edge-cut lens barrel, a device and a mold used do not have to be round.

Another object of the present invention is to provide a lens and a camera module and a manufacturing method thereof, wherein the time and cost spent in the design and processing of the chord edge portion of the edge-cut lens barrel may be reduced relative to the conventional round shape, and the corresponding processing yield will be improved.

Another object of the present invention is to provide a lens and a camera module and a manufacturing method thereof, wherein the corresponding cooperation of the chord edge portion of the edge-cut lens barrel and the base facilitates the assembly of the camera module, and the installation direction can be quickly determined.

Another object of the present invention is to provide a lens and a camera module and a manufacturing method thereof, wherein the circuit assembly can be mounted more compactly by the reduction of the body shapes of the edge-cut lens barrel and the base.

Another object of the present invention is to provide a lens and a camera module and a manufacturing method thereof, wherein the edge-cut lens sheet is disposed correspondingly to the photosensitive chip of the circuit assembly, and the non-imaging region of the edge-cut lens sheet is reduced relative to the body shape of the photosensitive chip of the circuit assembly, and the influence is also decreased accordingly.

Another object of the present invention is to provide a lens and a camera module and a manufacturing method thereof, wherein the edge-cut lens sheet is one-shot molded by injection molding, and the chord edge is formed correspondingly, so that the production difficulty is reduced while the manufacturing cost is reduced.

Another object of the present invention is to provide a lens and a camera module and a manufacturing method thereof, wherein the edge-cut lens barrel and other devices corresponding to the edge-cut lens sheet are one-shot molded by injection molding, and their manufacturing molds also have body shapes corresponding to the lens sheet.

Another object of the present invention is to provide a lens and a camera module and a manufacturing method thereof, wherein by the corresponding edge-cut lens sheet, the edge-cut lens barrel, the base and the circuit assembly, they can readily correspond to each other when assembling, thereby simplifying the assembly process.

Another object of the present invention is to provide a lens and a camera module and a manufacturing method thereof, wherein by the corresponding edge-cut lens sheet, the edge-cut lens barrel, the base and the circuit assembly, the body shape of the camera module is correspondingly reduced, achieving an ultra-narrow camera module with respect to the conventional art.

Another object of the present invention is to provide a lens and a camera module and a manufacturing method thereof, wherein the lens is matched with the design requirement of the base, so that the size of the camera module can be miniaturized as a whole.

In order to achieve at least one of the above objects, an aspect of the present invention provides a lens comprising: at least one edge-cut lens sheet, wherein the edge-cut lens sheet includes at least one chord edge and at least one circular edge, the chord edge and the circular edge being adjacently connected to each other, and wherein the chord edge and the circular edge have different curvatures.

According to some embodiments, in the lens, the chord edge has a curvature of zero and is a straight line segment.

According to some embodiments, in the lens, the circular edge has a curvature greater than 0, and is an arc line segment.

According to some embodiments, in the lens, the chord edge is a straight line and the circular edge is a circular arc.

According to some embodiments, in the lens, the number of the chord edges and the number of the circular edges are 1, and the chord edge has a curvature of zero and is a straight line segment.

According to some embodiments, in the lens, the number of chord edges is 2, and each of the chord edges has a curvature of 0 and is a straight line segment.

According to some embodiments, in the lens, the number of chord edges is 2, the number of circular edges is 2, and the chord edges are symmetrically distributed.

According to some embodiments, in the lens, the chord edges are straight line segments.

According to some embodiments, in the lens, the lens comprises a plurality of lens sheets, at least one of which is the edge-cut lens sheet and at least one of which is a round lens sheet.

According to some embodiments, in the lens, the edge-cut lens sheet is larger than the round lens sheet in size.

According to some embodiments, in the lens, the lens comprises four lens sheets, wherein the lens sheets are sequentially increased in size, and wherein the lens sheet having the largest size is the edge-cut lens sheet.

According to some embodiments, in the lens, the lens comprises an edge-cut lens barrel, in which the edge-cut lens sheet is mounted.

According to some embodiments, in the lens, the edge-cut lens barrel includes a chord edge portion and a circular edge portion, and wherein the chord edge portion and the circular edge portion have different curvatures in their section edges.

According to some embodiments, in the lens, the chord edge of the edge-cut lens sheet corresponds to the chord edge portion of the edge-cut lens barrel.

According to some embodiments, in the lens, the edge-cut lens sheet is one-shot molded by means of injection molding.

According to some embodiments, the lens comprises at least one optical path element, which is disposed adjacently to the lens sheets to facilitate formation of a predetermined light passage in the lens sheets.

According to some embodiments, in the lens, the outer edge shape of the optical path element at the edge-cut lens sheet is consistent with the shape of the edge-cut lens sheet.

According to some embodiments, in the lens, the optical path element is selected from the group consisting of a gasket, a shim and a coating.

Another aspect of the present invention provides a camera module, comprising: a lens, wherein the lens comprises at least one edge-cut lens sheet, wherein the edge-cut lens sheet includes at least one chord edge and at least one circular edge, the chord edge and the circular edge being adjacently connected to each other, and wherein the chord edge and the circular edge have different curvatures; and a photosensitive assembly, wherein the lens is located in the photosensitive path of the photosensitive assembly.

According to some embodiments, in the camera module, the photosensitive assembly includes at least one base, at least one photosensitive chip and at least one circuit board, and wherein the base is disposed on the circuit board so as to provide a mounting position, the photosensitive chip is electrically connected to the circuit board, and the lens is located in the photosensitive path of the photosensitive chip.

According to some embodiments, in the camera module, the base is integrally formed on the circuit board to form at least one light window to provide a light passage for the photosensitive chip.

According to some embodiments, in the camera module, the base includes a base main body and a supplementary base, the base main body has a notch, and the supplementary base supplements the notch to form a closed window.

According to some embodiments, in the camera module, the edge-cut position of the lens corresponds to the position of the supplementary base.

According to some embodiments, in the camera module, the base is adhesively fixed to the circuit board.

According to some embodiments, in the camera module, the circuit board includes a circuit board main body and at least one electronic element, which is disposed on the circuit board main body, and wherein the base is integrally formed on the circuit board main body and encapsulates at least one of the electronic elements.

According to some embodiments, in the camera module, the circuit board includes a circuit board main body and at least one electronic element, wherein at least one of the electronic elements is disposed at the bottom of the circuit board main body, and the base is integrally formed at the top of the circuit board main body.

According to some embodiments, in the camera module, the circuit board has a sinking region, in which the photosensitive chip is sunkenly disposed.

According to some embodiments, in the camera module, the sinking region is selected as a groove or a through hole.

According to some embodiments, in the camera module, the photosensitive chip has a photosensitive region and a non-photosensitive region, and the base integrally packages at least a part of the non-photosensitive region.

According to some embodiments, in the camera module, the camera module comprises at least one filter element, and wherein the base integrally packages the filter element.

According to some embodiments, in the camera module, the camera module comprises a blocking lens, which is located above the photosensitive chip and is integrally packaged by the base.

According to some embodiments, in the camera module, the blocking lens is the edge-cut lens sheet.

According to some embodiments, the camera module comprises a lens carrying element, and wherein the lens is mounted to the lens carrying element, and the lens carrying element is mounted to the base.

According to some embodiments, in the camera module, the lens carrying element is a driving component to form a moving focus camera module.

According to some embodiments, in the camera module, the lens carrying element is a lens fixing component to form a fixed focus camera module.

According to some embodiments, the lens carrying element is integrally connected to the base, and the lens is mounted to the lens carrying element to form a fixed focus module.

According to some embodiments, a plurality of camera modules form an array of camera modules.

Another aspect of the present invention provides a lens, comprising: at least one edge-cut lens sheet and an edge-cut lens barrel, in which the edge-cut lens sheet is mounted, wherein the edge-cut lens sheet includes at least one chord edge and at least one circular edge, and the chord edge and the circular edge are adjacently connected to each other, and wherein the chord edge and the circular edge have different curvatures, the edge-cut lens barrel includes a chord edge portion, which corresponds to the chord edge of the edge-cut lens sheet so as to reduce the volume of the lens.

Another aspect of the present invention provides a camera module, comprising:

a lens, which comprises at least one edge-cut lens sheet and an edge-cut lens barrel, in which the edge-cut lens sheet is mounted, wherein the edge-cut lens sheet includes at least one chord edge and at least one circular edge, and the chord edge and the circular edge are adjacently connected to each other, and wherein the chord edge and the circular edge have different curvatures, the edge-cut lens barrel includes a chord edge portion, which corresponds to the chord edge of the edge-cut lens sheet so as to reduce the volume of the lens; and a photosensitive assembly, wherein the lens is in the photosensitive path of the photosensitive assembly.

According to some embodiments, the circuit board includes a first board body and a second board body, and the first board body and the second board body are electrically connected by a connecting medium, the second board body is used for electrically connecting an electronic device, the base is disposed on the first board body, and the chord edge of the edge-cut lens sheet is located on the side close to the second board body.

According to some embodiments, the circuit board includes a first board body and a second board body, the first board body is electrically connected to the second board body by a connecting medium, the second board body is used for electrically connecting an electronic device, the base is disposed on the first board body, and the chord edge of the edge-cut lens sheet and the chord edge portion of the edge-cut lens barrel are located on the side close to the second board body.

According to some embodiments, the circuit board includes a first board body and a second board body, the first board body is electrically connected to the second board body by a connecting medium, the second board body is used for electrically connecting an electronic device, the base is disposed on the first board body, and the chord edge of the edge-cut lens sheet is located on the side away from the second board body.

According to some embodiments, the circuit board includes a first board body and a second board body, and the first board body and the second board body are electrically connected by a connecting medium, the second board body is used for electrically connecting an electronic device, the base is disposed on the first board body, and the chord edge of the edge-cut lens sheet and the chord edge portion of the edge-cut lens barrel are located on the side away from the second board body.

According to some embodiments, the circuit board includes a first board body and a second board body, the first board body is electrically connected to the second board body by a connecting medium, the second board body is used for electrically connecting an electronic device, the base is disposed on the first board body, the edge-cut lens sheet includes two chord edges, one of which is located on the side close to the first board body, and the other of which is located on the side away from the second board body.

According to some embodiments, the circuit board includes a first board body and a second board body, the first board body is electrically connected to the second board body by a connecting medium, the second board body is used for electrically connecting an electronic device, the base is disposed on the first board body, the edge-cut lens sheet includes two chord edges, the edge-cut lens barrel includes two chord edge portions, one of the chord edges and one of the chord edge portions are located on the side close to the first board body, and the other of the chord edges and the other of the chord edge portions are located on the side away from the second board body.

According to some embodiments, the base includes four side edges, which are a first side edge, a second side edge, a third side edge and a fourth side edge, respectively, the first side edge, the second side edge, the third side edge, and the fourth side edge are adjacently connected to each other to form a light window to provide a light passage for the photosensitive chip, the first side edge is close to the second board body, and the chord edge is located in the direction of the first side edge.

According to some embodiments, the width dimension of the first side edge is smaller than that of the second side edge and that of the fourth side edge.

According to some embodiments, the base includes four side edges, which are a first side edge, a second side edge, a third side edge and a fourth side edge, respectively, the first side edge, the second side edge, the third side edge, and the fourth side edge are adjacently connected to each other to form a light window to provide a light passage for the photosensitive chip, the first side edge is close to the second board body, the third side edge is opposite to the first side edge, and the chord edge is located in the direction of the third side edge.

According to some embodiments, the width dimension of the second side edge is smaller than that of the second side edge and that of the fourth side edge.

According to some embodiments, the base includes four side edges, which are a first side edge, a second side edge, a third side edge and a fourth side edge, respectively, the first side edge, the second side edge, the third side edge, and the fourth side edge are sequentially and adjacently connected to each other to form a light window to provide a light passage for the photosensitive chip, the first side edge is close to the second board body, and the third side edge is opposite to the first side edge, and wherein one of the chord edges is located in the direction of the first side edge, and the other of the chord edges is located in the direction of the third side edge.

According to some embodiments, the circuit board includes a first board body and a second board body, and the first board body and the second board body are electrically connected by a connecting medium, the second board is used for electrically connecting an electronic device, and the base is disposed on the first board body.

According to some embodiments, the circuit board includes at least one electronic element, which is disposed on the first board body, and wherein the base is integrally formed on the first board body and encapsulates at least one of the electronic elements.

According to some embodiments, the electronic element is selectively disposed on one side edge, two side edges, three side edges, or four side edges of the four side edges of the base.

According to some embodiments, the electronic element is disposed at the position of the second side edge and the fourth side edge.

According to some embodiments, the electronic element is disposed at the position of the first side edge and the third side edge.

According to some embodiments, the photosensitive chip is electrically connected to the first board body by an electrical connection element, and the base is integrally formed on the first board body, and encapsulates the electrical connection element.

According to some embodiments, the electrical connection is selectively disposed on two sides, three sides, or four sides of the four sides of the base.

According to some embodiments, the electrical connection element is disposed at the position corresponding to the second side edge and the fourth side edge.

According to some embodiments, the electrical connection element is disposed at the position corresponding to the first side edge and the third side edge.

BRIEF DESCRIPTION OF THE DRAWINGS

FIG. 7 is a schematic view of a first modified embodiment of the lens in accordance with the first preferred embodiment of the present invention.

FIG. 8 is a schematic view of a second modified embodiment of the lens in accordance with the first preferred embodiment of the present invention.

FIG. 9 is a schematic view of a third modified embodiment of the lens in accordance with the first preferred embodiment of the present invention.

FIG. 10 is a schematic view of a fourth modified embodiment of the lens in accordance with the first preferred embodiment of the present invention.

FIG. 11 is a schematic view of a fifth modified embodiment of the lens in accordance with the first preferred embodiment of the present invention.

DETAILED DESCRIPTION OF THE EMBODIMENTS

Figure 1:
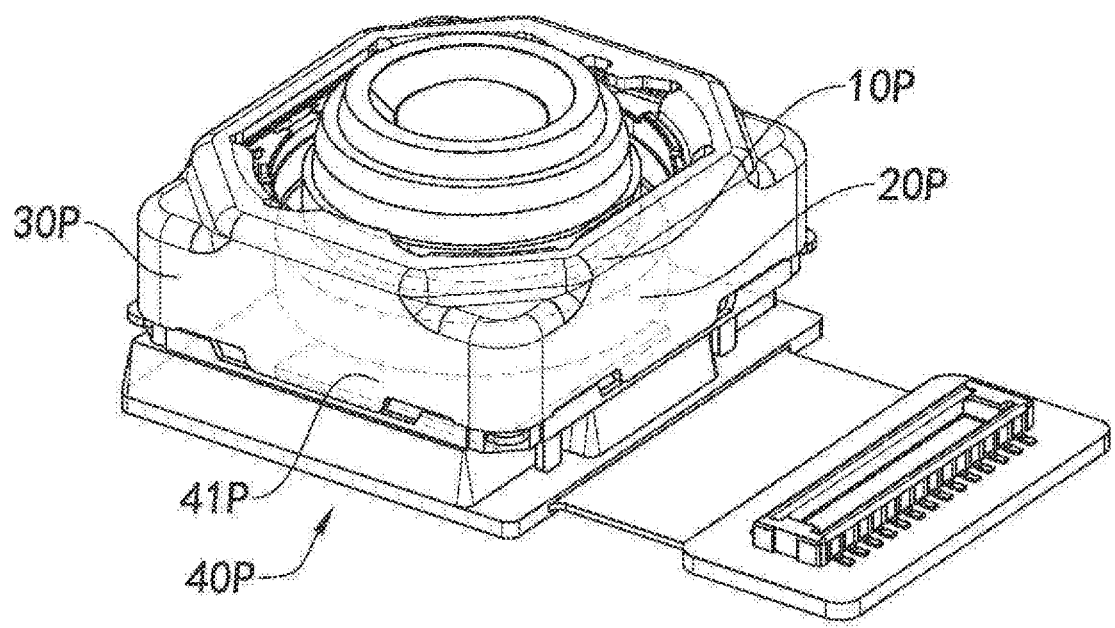
FIG. 1 is an overall perspective view of a conventional camera module.
Figure 2:
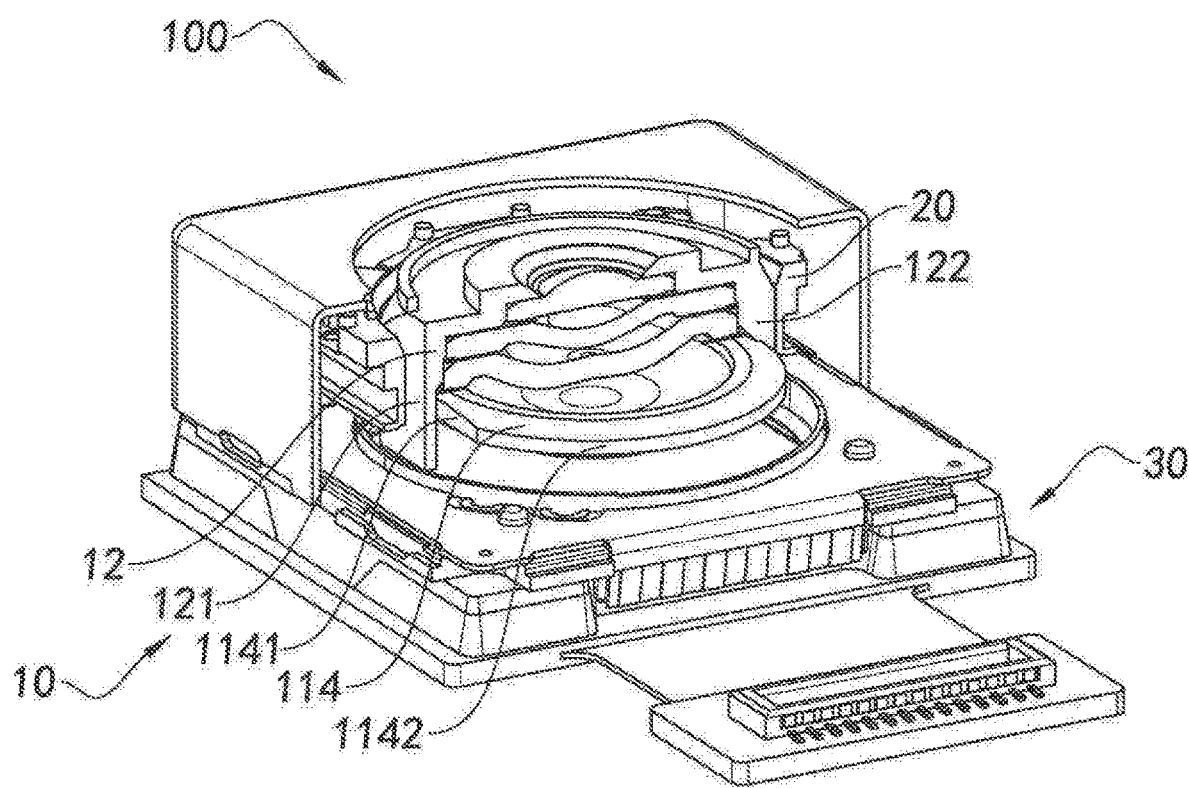
FIG. 2 is a perspective view of a camera module in accordance with a first preferred embodiment of the present invention.
Figure 3:
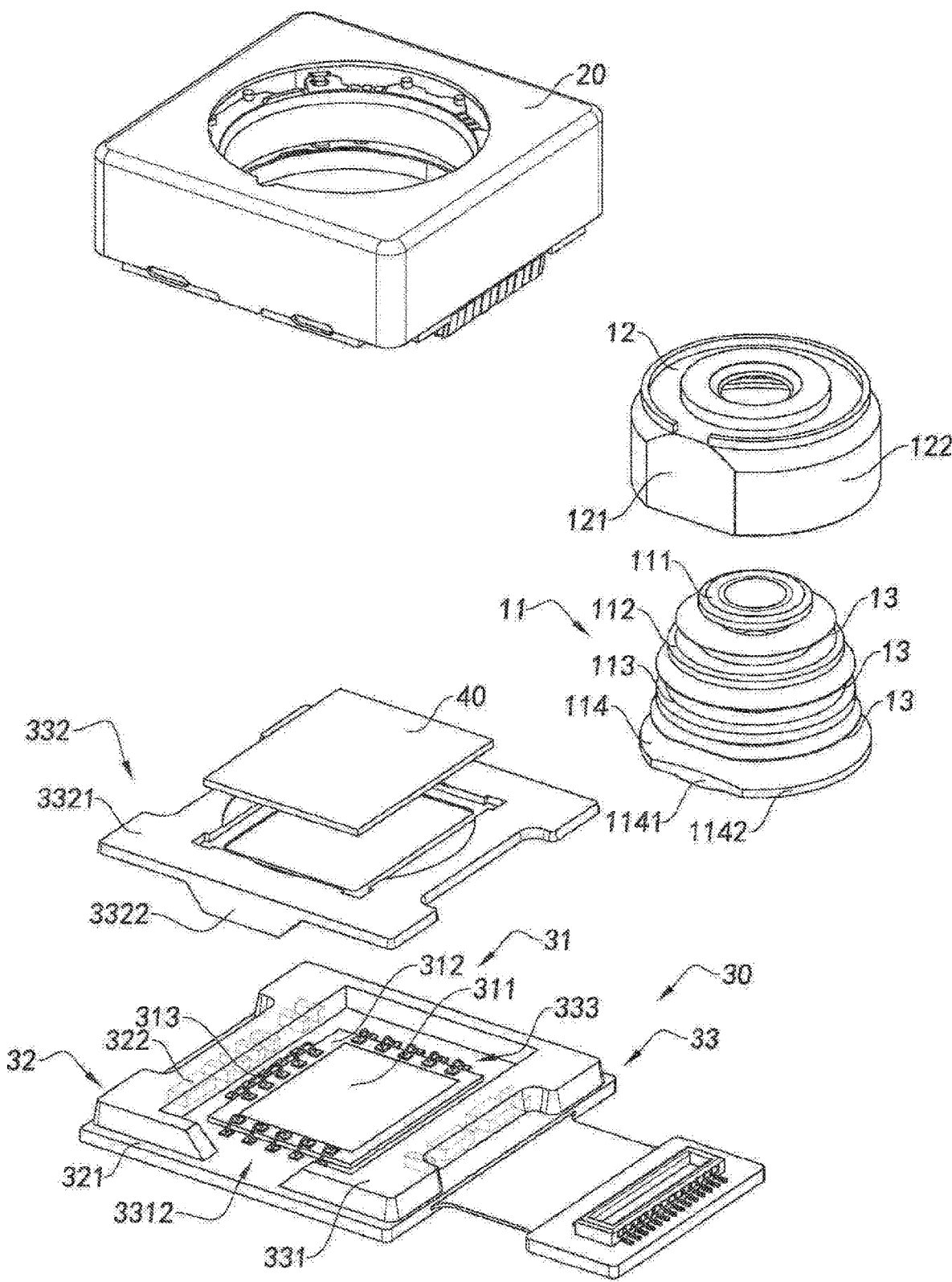
FIG. 3 is an exploded view of the camera module in accordance with the first preferred embodiment of the present invention.
Figure 4:
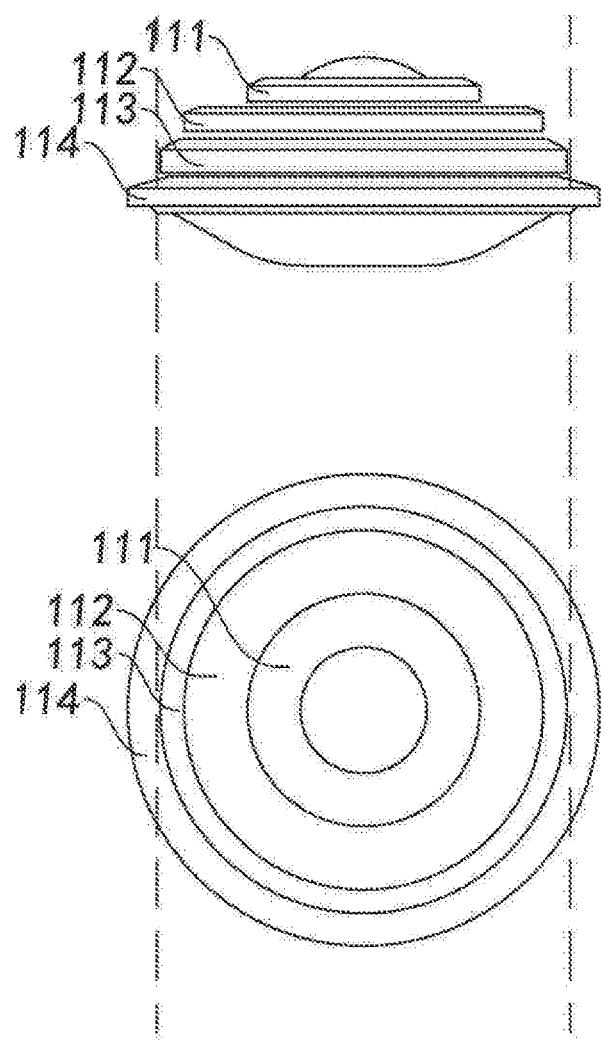
FIG. 4 is an exploded view of a lens in accordance with the first preferred embodiment of the present invention.

The following description is presented to disclose the invention to enable those skilled in the art to practice the present invention. The preferred embodiments in the following description are by way of example only, and other obvious modifications will occur to those skilled in the art. The basic principles of the present invention as defined in the following description may be applied to other embodiments, modifications, improvements, equivalents, and other embodiments without departing from the spirit and scope of the present invention.

It should be understood by those skilled in the art that in the disclosure of the present invention, the orientation or positional relationship indicated by the terms "longitudinal", "transverse", "upper", "lower", "front", "back", "left", "right", "upright", "horizontal", "top", "bottom", "inside", "outside", etc. is based on the orientation or positional relationship shown in the figures, which is merely for convenience of description of the present invention, and does not indicate or imply that the mentioned apparatus or element must have a particular orientation or be constructed and operated in a particular orientation. Therefore, the above-mentioned terms are not to be construed as limiting the present invention.

It should be understood that the term "a" is understood to mean "at least one" or "one or more", that is, in one embodiment, the number of elements may be one, and in other embodiments, the number of elements may be multiple, and the term "a" cannot be construed as limiting the quantity.

With the development of smart electronic devices, the requirements for camera modules are becoming higher and higher. For example, smart phones are developing toward the direction of ultra-thin, large screen, borderless, and high image quality. As can be seen from the foregoing, a camera module is composed of different components. With the development of high speed, the simplification of the components almost reaches the ultimate level, and for further development, in addition to studying possible improvements of each component, the improved matching relationship between the respective components also needs to be considered. According to the present invention, there is provided a lens, which can improve the lens of the camera module to reduce its body shape while ensuring the optical imaging quality. Further, the structures of the lens and the remaining components such as a photosensitive assembly can be matched to each other, so that the overall size of the camera module can be reduced, and its external shape is more consistent, which is more suitable for being mounted in an electronic device.

A camera module 100 according to this preferred embodiment of the present invention is as shown in FIGS. 2 to 6.

The camera module 100 includes a lens 10 and a photosensitive assembly 30, wherein the lens 10 is in the photosensitive path of the photosensitive assembly 30, and wherein the lens 10 is an ultra-narrow lens 10, and may also be referred to as an edge-cut lens 10.

Further, in this embodiment of the present invention, the shape of the lens 10 is matched with the shape of the photosensitive assembly 30, so that the camera module 100 becomes an ultra-narrow camera module 100.

Specifically, the lens 10 includes at least one edge-cut lens sheet and an edge-cut lens barrel 12, wherein the edge-cut lens sheet is mounted in the edge-cut lens barrel 12. At least a portion of a circular edge of the edge-cut lens sheet is removed, thereby reducing the body shape of the edge-cut lens sheet relative to a round shape and providing the advantage of reducing stray light. Further, at least a portion of the circular edge of the edge-cut lens barrel 12 is removed relative to a round lens barrel, so that the overall body shape of the lens 10 is reduced, and the lens 10 and the edge-cut shape are more suitable for matching with other components. The edge-cut of the edge-cut lens sheet is relative to a circular edge of a round lens sheet, that is, at least a portion of the circular edge of the round lens sheet is removed or replaced so that the edge of the round lens sheet is not a complete circle.

Further, the lens 10 includes a plurality of lens sheets 11 including at least one edge-cut lens sheet and at least one round lens sheet. The number of edge-cut lens sheets and the position of the edge-cut lens sheets may be selected as desired. The round lens sheet and the edge-cut lens sheet are separately mounted in the edge-cut lens barrel.

In this embodiment of the present invention, the lens 10 composed of four lens sheets 11 is schematically explained as an example, and in other embodiments of the present invention, the number of the lens sheets 11 may be another number such as 2, 3, 5 and more. In the lens 10 having different number of lens sheets, the shape of corresponding lens sheets 11 may also be designed according to specific needs, so that at least one of the lens sheets 11 is the edge-cut lens sheet.

More specifically, in this embodiment of the present invention and as shown in the accompanying drawings, one of the lens sheets 11 is an edge-cut lens sheet, the remaining three lens sheets are round lens sheets, and the edge-cut lens sheet is at the bottommost.

Of course, in other embodiments of the present invention, the number of the edge-cut lens sheets may be another number such as 2, 3 and 4. The position of the edge-cut lens sheet among the four lens sheets 11 may also be selected as desired, and it should be understood by those skilled in the art that the present invention is not limited in this aspect.

In this embodiment and the accompanying drawings of the present invention, the four lens sheets 11 of the lens 10 are a first lens sheet 111, a second lens sheet 112, a third lens sheet 113, and a fourth lens sheet 114, respectively, from an object side to an image side. Also, the body shapes of the four lens sheets 11 increase sequentially from the object side to the image side. That is, the closer the lens sheet 11 of the lens 10 is to the photosensitive assembly 30, the larger its body shape is. For example, in this embodiment, the fourth lens sheet 114 has the largest body shape. It is worth mentioning that each of the lens sheets 11 is mounted in the edge-cut lens barrel 12, and in the case where the axial dimension of the edge-cut lens barrel 12 is the same, the overall volume of the lens 10 is decided by the lens sheet 11 having the largest body shape. In this embodiment of the present invention, since the largest lens sheet 11, namely, the fourth lens sheet 114 is an edge-cut lens sheet, the shape of the edge-cut lens barrel 12 changes with it, and the overall body shape of the lens 10 is reduced. That is, in this embodiment, the first lens sheet 111, the second lens sheet 112, the third lens sheet 113 are round lens sheets, and the fourth lens sheet 114 is the edge-cut lens sheet. Of course, in other embodiments of the present invention, other lens sheet 11 may be selected to perform an edge-cut design instead of the lens sheet 11 having the largest body shape, and the present invention is not limited in this aspect.

It is worth mentioning that although in this embodiment of the present invention, it is exemplified that the shapes of the four lens sheets 11 increase sequentially, but in other embodiments of the present invention, each of the lens sheets 11 may be arranged in other shape arrangement, for example, an arrangement of the same size, such as the lens sheets having the same size in the middle, the smallest lens sheet at the front end, and the largest lens sheet at the bottom, or the smallest lens sheet at the front end and all the other lens sheets having the same size at the rear end. In the present invention, it is preferred that the bottom lens sheet is the largest.

The photosensitive assembly 30 includes a photosensitive chip 31, wherein the lens sheet 11 of the edge-cut design is designed to be edge-cut according to the shape and size of the photosensitive chip 31. That is, the design of the edge-cut lens sheet is referenced by the photosensitive chip 31 to ensure the imaging quality of the camera module 100. In particular, in some embodiments, the design of the edge-cut lens sheet is designed with the shape and size of a photosensitive region of the photosensitive chip 31.

In order to reduce the body shape of the lens 10, an edge-cut design is performed. Preferably, the body shape of the largest lens sheet 11 in the lens 10, namely, the body shape of the fourth lens sheet 114 closest to the image side, is reduced according to the size of the photosensitive chip 31. In particular, in some embodiments, the fourth lens sheet 114 is reduced to a size corresponding to the photosensitive chip 31.

Figure 5:
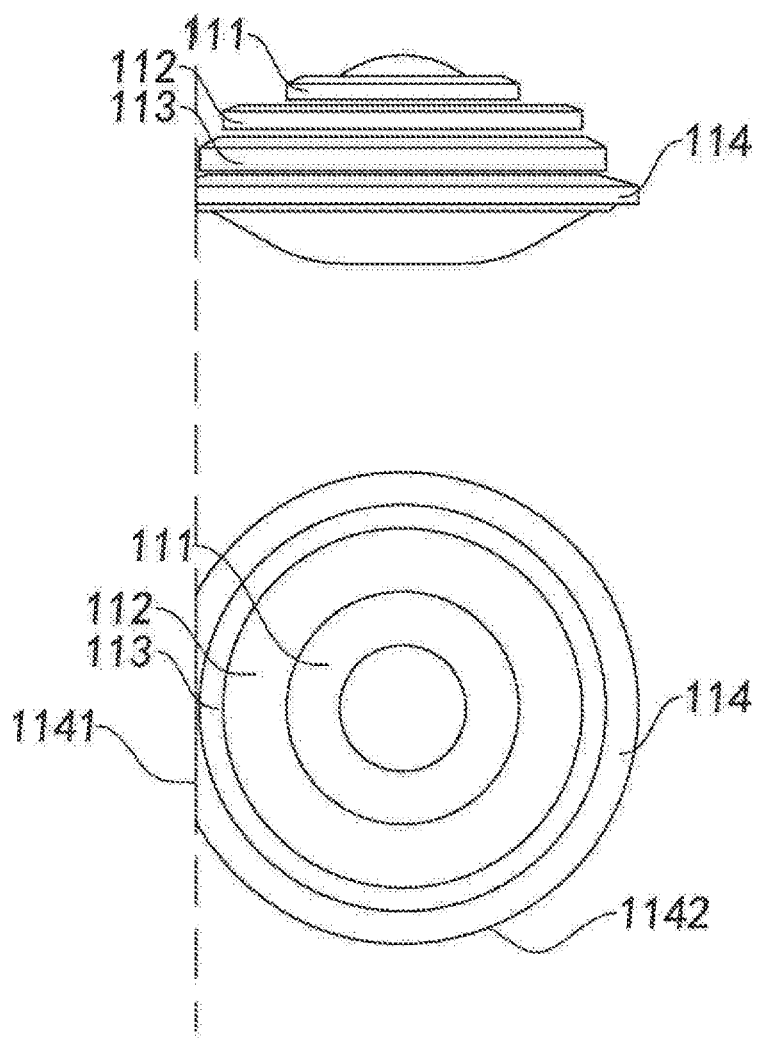
FIG. 5 is a schematic view of the design principle of the lens in accordance with the first preferred embodiment of the present invention.
Figure 6:
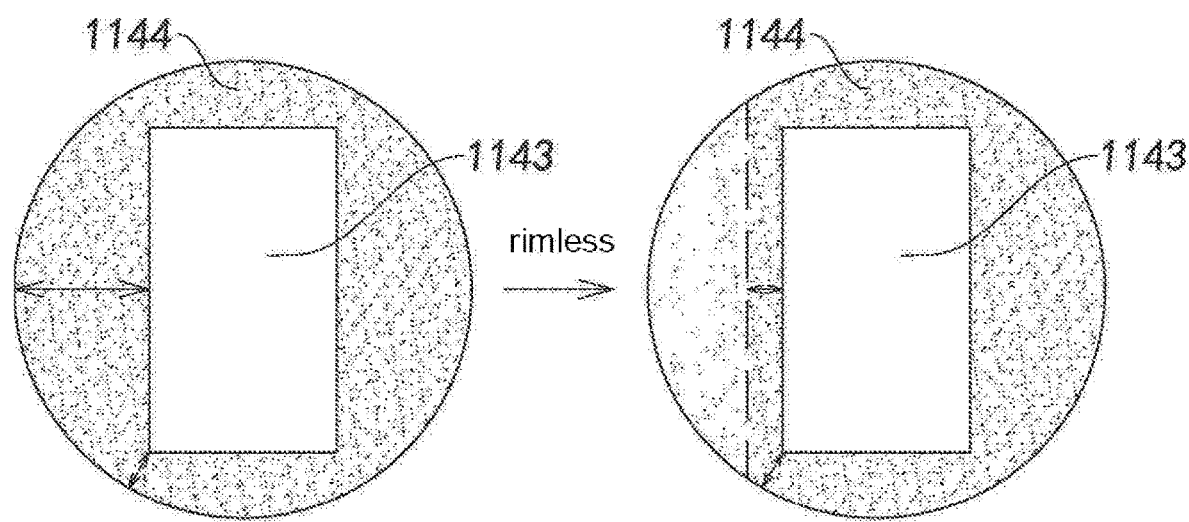
FIG. 6 is a schematic view of comparison of imaging light in accordance with the first preferred embodiment of the present invention and a conventional lens.

As shown in FIGS. 5 and 6, it is worth mentioning that the edge-cut lens sheet of the lens 10 further includes at least one chord edge, that is, the fourth lens sheet 114 includes a chord edge 1141. The chord edge 1141 of the fourth lens sheet 114 closest to the image side causes a corresponding reduction in the body shape of the fourth lens sheet 114 relative to a complete round lens sheet. That is, the body shape of the fourth lens sheet 114 with the chord edge 1141 is smaller than the body shape of a corresponding round lens sheet. It should be noted that, in a preferred embodiment of the present invention, the chord edge 1141 of the fourth lens sheet 114 is an edge portion formed by a line segment other than the original circular edge in a round cross-sectional view of the fourth lens sheet 114. That is, the fourth lens sheet 114 of the lens 10 further includes at least one circular edge 1142. It should be noted herein that the chord edge 1141 of the fourth lens sheet 114 may be not only a straight line segment, but also an arc line segment or any line segment that matches with the photosensitive chip 31 of the photosensitive assembly 30. According to a complete round lens sheet, the chord edge 1141 may also be understood as an edge portion of the lens sheet 11 that is missing relative to a complete circle. Then, the chord edge 1141 plays a key function in reducing the body shape of the fourth lens sheet 114 and that of the lens 10.

In other words, the edge of the edge-cut lens sheet is composed of at least two line segments having different curvatures adjacently connected to each other so that the edge of the edge-cut lens sheet 11 is not a complete circle. That is, the chord edge 1141 and the circular edge 1142 are adjacently connected to each other to form an edge of the lens sheet 11, and the chord edge 1141 and the circular edge 1142 have different curvatures. Preferably, the curvature of the chord edge 1141 is 0, that is, a straight line segment, and the curvature of the circular edge 1142 is greater than 0, namely, an arc line segment.

Then, a schematic view of the overall lens sheet 11 is as shown in FIG. 5. In the present preferred embodiment, in the lens 10 composed of the four lens sheets 11, the fourth lens sheet 114 closest to the image side has one chord edge 1141 and one circular edges 1142. The lens sheet 11, the second lens sheet 112, and the third lens sheet 113 each have one circular edge 1142. That is, the first lens sheet 11, the second lens sheet 112, and the third lens sheet 113 are round lens sheets, and the fourth lens sheet 114 is an edge-cut lens sheet of which one side is removed.

It is worth mentioning that, although in this embodiment of the present invention, the fourth lens sheet 114 composed of one chord edge 1141 and one circular edge 1142 is taken as an example to explain the structural design of the edge-cut lens sheet, in other embodiments of the present invention, the number and shape, layout, and the like of the chord edge 1141 and the circular edge 1142 may be other than those, and the present invention is not limited in this aspect. For example, there may be 2 chord edges 1141 and 2 circular edges 1142, 3 chord edges 1141 and 3 circular edges 1142, or 4 chord edges 1141 and 4 circular edges 1142, etc. The size ratio and positions of the chord edge 1141 and the circular edge 1142 can be set according to different requirements, such as a symmetric arrangement, an asymmetric arrangement, an arrangement according to a predetermined ratio, etc., and the present invention is not limited in this aspect.

Further, the lens 10 includes at least one optical path element 13 disposed between two adjacent lens sheets 11 to form a predetermined light passage between the respective lens sheet 11. By way of example but not limitation, the optical path element 13 can be a gasket, a shim, a coating, or the like. The outer edge shape of the optical path element 13 is consistent with the outer shape of the lens sheet 11 to facilitate blocking of the corresponding edge of the lens sheet 11. The lens sheet 11 and the optical path elements 13 are each disposed sequentially at intervals inside the edge-cut lens barrel 12.

In this embodiment of the present invention, the number of the lens sheet 11 is 4, and correspondingly, the number of the optical path elements 13 is 3, which are a first optical path element 131, a second optical path element 132 and a third optical path element 133, respectively. The first optical path element 131 is disposed between the first lens sheet 111 and the second lens sheet 112, the outer shape of the first optical path element 131 is consistent with the outer shape of the second lens sheet 112, the second optical path element 13 is disposed between the second lens sheet 112 and the third lens sheet 113, and the outer shape of the second optical path element 13 is consistent with the outer shape of the third lens sheet 113. The third optical path element 13 is disposed between the third lens sheet 113 and the fourth lens sheet 114, and the outer shape of the third optical path element 13 is consistent with the outer shape of the fourth lens sheet 114. That is, in this embodiment, the first optical path element 131 and the second optical path element 132 are optical path elements having round outer shapes, and the third optical path element 133 is an edge-cut optical path element, namely, with at least one straight edge and at least one arc edge.

Preferably, each of the lens sheets 11 is integrally formed in a process of manufacturing. It should be understood by those skilled in the art that the body shape of the lens sheet 11 may preferably be one-shot molded by injection molding. Moreover, with respect to the round shape of the circular edge 1142, the time and cost of the chord edge 1141 spent in the processing and design of the mold may be reduced, and the material used is remarkably reduced. According to the design, the lens sheet 11 having a desired shape can be obtained after injection molding by changing the shape of the injection molding space of the mold. Further, the optical path element 13 and the edge-cut lens barrel 12 used for assembly both need to be obtained by injection molding after a mold is customized according to this shape. When assembling, the chord edge 1141 has a certain guiding effect, and the lens sheet 11 may be positioned according to the position of the chord edge 1141.

More specifically, the clear aperture of the lens 10 is decided by the smallest lens sheet 11 and the optical path element 13. That is, a large portion of the lens sheet 11 closest to the image side as in FIG. 5 has a less effect on imaging. When the chord edge 1141 is employed, as shown in FIG. 6, not only the body shapes of the lens sheet 11 and the lens 10 are reduced, but also the utilization ratio of the lens sheet 11 closest to the image side is improved. In the present preferred embodiment, the fourth lens sheet 114 closest to the image side is taken as an example. Under the action of the optical path element 13, the fourth lens sheet 114 correspondingly forms an imaging region 1143 and a non-imaging region 1144, wherein the imaging region 1143 corresponds to the photosensitive chip 31 of the photosensitive assembly 30, and is a main region where light is received, and wherein the non-imaging region 1144 blocks light from passing through, and a small amount of light passing through it does not perform a photosensitive action. That is, the imaging region 1143 of the lens sheet 11 provides a basis for a main imaging function of the camera module 100.

It is worth mentioning that the function of the optical path element 13 is to block the light of the edge of each of the lens sheets 11 to form a predetermined optical path, and to reduce stray light in the periphery. In an actual production process, the optical path element 13 is not completely opaque and the edge light can not be completely blocked. That is, the non-imaging region 1144 has less light passing through relative to the imaging region 1143 of the lens 1. The light passing through the non-imaging region 1144 is reflected at other portions of the photosensitive assembly 30, such as a base 33, a circuit board 32, an electrical connection element 313, etc., as subsequently proposed. The reflected light is received by the photosensitive chip 31, namely, becoming stray light that affects the image quality of the photosensitive chip 31. In the present invention, the fourth lens sheet 114 having the chord edge 1141 is employed. As shown in FIG. 6, the light intensity of the non-imaging region 1144 of the fourth lens sheet 114 may be weakened, and the formed stray light may also be reduced. The imaging effect of the camera module 100 will be improved. From the viewpoint of the imaging effect, a gradually weakened edge is formed in the imaging circle of the lens 10. That is, the edge-cut design of the lens sheet 11 causes the light intensity of a portion of the non-imaging region 1144 to be weakened, the influence of stray light is reduced, and the imaging effect is not affected or less affected. The chord edge 1141 of the lens sheet 11 does not affect the imaging region 1143, and the function of the camera module 100 will also be ensured to be complete.

It is worth mentioning that the chord edge 1141 of the lens sheet 11 causes the imaging region 1143 not to lose a portion correspondingly, but correspondingly an edge with gradually weakened brightness and imaging quality appears. In this way, the occupation ratio of the non-imaging region 1144 is reduced, and the effective imaging region 1143 is concentrated to a smaller local portion corresponding to the photosensitive chip 31. On the premise that no or less change in the image quality is made, the body shape of the lens sheet 11 is reduced, while the flux of light that is irradiated onto the non-imaging region 1144 is reduced, directly reducing the source of stray light. In addition, it is conceivable that in some embodiments, the chord edge 1141 of the lens sheet 11 should be consistent with the periphery of the photosensitive chip 31 of the photosensitive assembly 30, which greatly reduces the body shaped of the lens sheet 11 and the lens 10. In the preferred embodiment, it is contemplated that the fourth lens sheet 114 closest to the image side further requires a certain margin when assembling, and thus there is also a certain non-imaging region 1144.

In the present preferred embodiment, the optical path element 13 and the edge-cut lens barrel 12 need to be designed and manufactured according to the body shape of the lens sheet 11. Preferably, the optical path element 13 and the edge-cut lens barrel 12 are obtained by injection molding after a mold is customized.

Specifically, the edge-cut lens barrel 12 further includes at least one chord edge portion 121 and at least one circular edge portion 122, which correspond to the chord edge 1141 and the circular edge 1142 of the edge-cut lens sheet, respectively. In the present preferred embodiment, the chord edge 1141 is linear, and the chord edge portion 121 is correspondingly linear. Like the manufacture of the chord edge 1141 of the lens sheet 11, the time and cost of the linear chord edge portion 121 spent in the processing and design of the device and the mold are reduced relative to the circular arc edge. In this way, the lens 10, the edge-cut lens barrel 12, a subsequently proposed lens carrying element 20, and the photosensitive assembly 30 in the present preferred embodiment are all in a straight or square body shape, and are consistent with each other in the design and manufacturing process, so that the production difficulty is decreased, and the corresponding processing yield can be greatly improved.

The number and position of the chord edge portion 121 of the edge-cut lens barrel 12 correspond to those of the chord edge 1141 of the edge-cut lens sheet, and when the number of the chord edges 1141 is another number, the position, shape and number of the chord edge portion 121 also change accordingly.

More specifically, the chord edge portion 121 of the edge-cut lens barrel 12 is a flat surface, and the circular edge portion 122 of the edge-cut lens barrel 12 is a curved surface. That is, it can be seen from the top view of the edge-cut lens barrel 12 that the top view of the edge-cut lens barrel 12 is a closed curve composed of a circular arc and a straight line, and at this time, the shape of the lens barrel 12 is consistent with the shape of the top view of the fourth lens sheet 114. It is worth mentioning that since the edge-cut lens barrel 12 has a certain wall thickness, the consistency here does not mean that the sizes are completely identical. Of course, in other embodiments of the present invention, the number, position, and layout of the chord edge portion 121 and the circular edge portion 122 of the edge-cut lens barrel 12 may be other than these, such as 2 chord edge portions 121 and 2 circular edge portions 122, 3 chord edge portions 121 and 3 circular edge portions 122, 4 chord edge portions 121 and 4 circular edge portions 122, or the like. The size ratio and positions of the chord edge portion 121 and the circular edge portion 122 can be set according to different requirements, such as a symmetric arrangement, an asymmetric arrangement, an arrangement according to a predetermined ratio, etc., and the present invention is not limited in this aspect.

It is worth mentioning that the chord edge 1141 of the edge-cut lens sheet corresponds to the chord edge portion 121 of the edge-cut lens barrel 12, the circular edge 1142 of the edge-cut lens sheet corresponds to the circular edge portion 122 of the edge-cut lens barrel 12 so that the relative position of the lens sheet 11 and the edge-cut lens barrel 12 is determined. Therefore, the installation of the lens sheet 11 is more convenient, which is helpful to ensure the consistency of the light path. That is, the edge-cut design of the lens sheet 11 facilitates the positioning of the lens sheet 11, whereas in the conventional round lens sheet and round lens barrel, there is no defined relative position between the lens sheet and the barrel.

It should be particularly noted that the arrangement position of the chord edge portion 121 of the edge-cut lens barrel 12 may be matched with the photosensitive assembly 30, so that the overall edge of the camera module 100 is reduced, and this advantage will be explained later in detail.

The camera module 100 includes a filter element 40 for filtering light passing through the lens 10. The filter element 40 is, for example, but not limited to, an infrared cut-off filter, a blue glass filter, a wafer-level infrared cut-off filter, a whole transparent sheet, and a visible light filter. The filter element 40 is mounted to a supplementary support member 332 (subsequently proposed) located in the light passage of the photosensitive chip 31.

The camera module 100 further includes a lens carrying element 20, the lens 10 is mounted on the lens carrying element 20, and the lens carrying element 20 is mounted on the base 33 so that the lens 10 is in the photosensitive path of the photosensitive chip 31. For example, the lens carrying element 20 may be implemented as a lens fixing component or a driving component to form a fixed focus camera module 100 or a moving focus camera module 100, respectively. The driving component is, for example, but not limited to, a piezoelectric motor, or a voice coil motor. When the lens carrying element 20 is implemented as a driving component, the lens carrying element 20 is electrically connected to the photosensitive assembly 30, such as by a pin, a lead or the like.

Further, according to this embodiment of the present invention, the photosensitive assembly 30 further includes a circuit board 32 and a base 33, the photosensitive chip 31 is electrically connected to the circuit board 32, and the base 33 is disposed on the circuit board 32 to provide a mounting position and form a back focus required by the camera module 100.

Further, the base 33 is integrally connected to the circuit board 32. The base 33 includes a base main body 331 and has a light window 333. The light window 333 provides a light passage for the photosensitive chip 31. In other words, the photosensitive chip 31 is located inside the light window 333, and the photosensitive path of the photosensitive chip 31 is consistent with the direction of the light window 333.

The circuit board 32 includes a circuit board main body 321 and at least one electronic element 322. The photosensitive chip 31 is electrically connected to the circuit board main body 321 to facilitate transmitting photosensitive information to the circuit board 32. The lens 10 is in the photosensitive path of the photosensitive chip 31, so that the photosensitive chip 31 receives light and performs light sensing. In particular, in some embodiments, the photosensitive chip 31 may be disposed on the circuit board main body 321 through a surface mount technology (SMT), and be electrically connected to the circuit board main body 321 through at least one electrical connection element 313. The electrical connection element 313 is, for example, but not limited to, a gold wire, a silver wire, a copper wire, an aluminum wire, a solder, a conductive paste, or the like.

The electronic element 322 is disposed on the circuit board main body 321. By way of example but not limitation, the electronic element 322 is mounted on the circuit board main body 321 by the SMT technology. The electronic element 322 includes, but is not limited to, a resistor, a capacitor, a driving mechanism, or the like.

In this embodiment of the present invention, the base 33 is integrally packaged in the circuit board main body 321 and is integrally enclosed around the electronic element 322, thereby preventing dust and debris from attaching on the photosensor chip 31 to contaminate the electronic element 322 and affect the imaging effect similarly to the conventional camera module 100. It can be understood that, in another modified embodiment, it is also possible that the electronic element 322 is buried in the circuit board main body 321, that is, the electronic element 322 may not be exposed outside. It is worth mentioning that although in some embodiments, the electronic element 322 is disposed around the photosensitive chip 31, the arrangement position of the electronic element 322 can be designed and arranged as desired in different embodiments. For example, it is concentrated on one side or both sides, or disposed on the back surface of the circuit board main body 321 or the like, and may match with the arrangement position of the photosensitive chip 31 and the arrangement position of the electrical connection element 313 and the shape of the supplementary support member 332 subsequently proposed to more rationally utilize the spatial position on the circuit board main body 321 and reduce the size of the camera module 100 as much as possible.

The circuit board main body 321 of the circuit board 32 may be a PCB hard board, a PCB soft board, a Rigid-flex board, a ceramic circuit board main body 321 or the like. It is worth mentioning that, in this preferred embodiment of the present invention, since the base main body 331 can completely encapsulate the electronic elements 322, the electronic elements 322 may not be buried in the circuit board main body 321, and the board main body 321 is only used to form a conduction line, so that the finally obtained photosensitive assembly 30 can be made smaller in thickness.

Further, according to an embodiment of the present invention, the base main body 331 is disposed on the circuit board 32 by integral forming, such as molding, thereby stably fixing the base 33 and the circuit board 32 and reducing additional mounting and fixing processes. For example, the glue bonding process is reduced, the connection is more stable, the height of the glue connection is omitted, and the height of the unit of the camera module 100 is lowered.

For example, the base 33 may be disposed on the circuit board 32 by means of integral forming using a mold, such as being molded on a circuit board, which is different from the conventional COB (Chip On Board) manner. By integral forming using a mold, the molding shape and the flatness of the surface can be better controlled, for example, so that the base main body 331 has a better flatness, thereby provides a flat mounting condition for mounted components such as the lens carrying element 20 and the filter element 40, which is helpful to improve the optical axis consistency of the camera module 100. By the SMT technology, for example, the electronic elements 322 may each be mounted at an interval from each other on an edge region of the circuit board 32, e.g. on the outside of the photosensitive chip 31. It is worth mentioning that each of the electronic elements 322 may be located on the same side or opposite sides of the circuit board 32. For example, in one specific example, the photosensitive element 31 and each of the electronic elements 322 may be located on the same side of the circuit board 32, and the photosensitive element 31 is mounted to the chip mounting region of the circuit board 32. The electronic elements 322 are each mounted at an interval from each other on the edge region of the circuit board 32. The base main body 331 encapsulates each of the electronic elements 322 after being formed to isolate adjacent electronic elements 322 and isolate the electronic elements 322 from the photosensitive chip 31 by means of the base main body 331.

In the camera module 100 of the present invention, the way each of the electronic elements 322 is encapsulated by the base main body 331 after being formed has many advantages. Firstly, the base main body 331 encapsulates each of the electronic elements 322 so that the mutual interference between the adjacent electronic elements 322 does not occur. Even when the distance between adjacent electronic elements 322 is relatively close, the imaging quality of the camera module 100 can be ensured. In this way, a larger number of the electronic elements 322 can be mounted on the circuit board 32 with a small area, thereby making the structure of camera module 100 more compact, which is advantageous to improve the imaging quality of the camera module 100 on the basis of controlling the dimension of the camera module 100. Secondly, the base main body 331 encapsulates each of the electronic elements 322, so that there is no need to reserve a safety distance between the base main body 331 and each of the electronic elements 322, whether in the horizontal direction or in the height direction, to enable the reduction of the size of the camera module 100. Thirdly, the base main body 331 encapsulates each of the electronic elements 322 so that no glue is used for connection and leveling between the base main body 331 and the circuit board 32, which is advantageous to reduce the height dimension of the camera module 100. Fourthly, the base main body 331 encapsulates each of the electronic elements 322, and in the process of subsequently transporting and assembling the camera module 100 to form the camera module 100, the base main body 331 can prevent the electronic element 322 from shaking and falling off, which is advantageous to ensure the structural stability of the camera module 100. Fifthly, the base main body 331 encapsulates each of the electronic elements 322, and in the process of subsequently transporting and assembling the camera module 100 to form the camera module 100, the base main body 331 can prevent each of the electronic elements 322 from being contaminated by contaminants to ensure the image quality of the camera module 100. Sixthly, the base main body 331 encapsulates the electronic element 322 and then can isolate the electronic element 322 from the air. By this way, the oxidation rate of the metal portion of the electronic element 322 can be slowed down, which is advantageous to improve the environmental stability of the electronic element 322 and the camera module 100.

It is worth mentioning that the base main body 331 is integrally formed on the circuit board main body 321 and encapsulates the electronic element 322 of the circuit board 32 so that the base main body 331 and the circuit board main body 321 have a larger connecting area, and the connection is more stable, and they have a better structural strength by means of integral forming. Therefore, the base main body 331 can firmly and reliably support and fix the components of the camera module 100, thereby ensuring the yield of the product.

It is also worth mentioning that for the unit of high-pixel camera module 100, the number of the lens sheets 11 of the lens 10 is increasing, for example, up to 4p, up, 6p or more. When the number of the lens sheets 11 of the lens 10 increases, it is necessary to meet the requirements of optical performance at the same time, such as providing sufficient back focus to prevent the filter element 40 from affecting the imaging quality of the camera module 100, such as the occurrence of black spots, blurred edges and the like on the image. In an embodiment according to the present invention, the filter element 40 is mounted on the integrally formed base 33, so that the filter element 40 can be provided with a flat mounting condition and the height position at which the filter element 40 is mounted can be effectively controlled through the height of the base 33.

The photosensitive chip 31 has a photosensitive region 311 for performing a photosensitive function, and a non-photosensitive region 312312 for electrically connecting to the circuit board 32. In this embodiment of the present invention, the non-photosensitive region 312 is electrically connected to the circuit board 32 through the electrical connection element 313.

In this embodiment of the present invention, the photosensitive chip 31 is located inside the base main body 331, that is, it is not integrally packaged by the base main body 331. In this embodiment of the present invention, the photosensitive chip 31 needs to be mounted on the circuit board 32, for example, by glue bonding, so that the photosensitive chip 31 is stably fixed. Thereafter, the photosensitive chip 31 is electrically connected to the circuit board 32 through the electrical connection element 313, for example, by means of a gold wire. Of course, in other embodiments of the present invention, the way the photosensitive chip 31 is disposed on the circuit board 32 may be performed by other means, such as embedding, sinking, FC (Flip Chip), and the like. It should be understood by those skilled in the art that the connection and mounting manner of the photosensitive chip 31 and the circuit board 32 are not limiting to the present invention.

More specifically, in this embodiment of the present invention, the base 33 further includes a supplementary support member 332 that is supplemented to the base main body 331 to form the closed light window 333.

The base main body 331 has a mounting groove 3311 communicating with the light window 333. The supplementary support member 332 is mounted in the mounting groove 3311 to provide a mounting position for the filter element 40.

Further, the base main body 331 has at least one notch 3312. The notch 3312 communicates with the optical window 333 and the outside, and the notch 3312 is supplemented by the supplementary support member 332, thereby forming the light window 333 whose side is closed.

In other words, in such an embodiment, the base main body 331 is not a closed structure, but an open structure, and the base main body 331 is closed by supplementation of the supplementary support member 332. Of course, in other embodiments of the present invention, the base main body 331 may also be a closed structure.

In this embodiment of the present invention, the notch 3312 extends downwardly to the circuit board body 321. The supplementary support member 332 includes at least one support member body 3321 and an extension leg 3322 extending integrally from the support member body 3321 downwardly to the circuit board main body 321 to close the notch 3312. By way of example but not limitation, the extension legs 3322 are connected to the circuit board body 321 and/or the base main body 331 by adhesive bonding. The support member body 3321 is mounted in the mounting groove 3311.

It is worth mentioning that, in this embodiment of the present invention, the chord edge portion 121 of the edge-cut lens barrel 12 corresponds to the position of the extension leg 3322 of the supplementary support member 332, so that the edge on the direction in which the extension leg 3322 are located may be narrower. In this embodiment, the electronic element 322 can be concentrated and disposed on a side where the base main body 331 is located, such as a side opposite the extension leg 3322, so that there is no need to dispose the electronic element 322 on the side on which the extension leg 3322 is located, and it is not necessary to reserve the mounting position of the electronic element 322. That is, the photosensitive chip 31 is closer to the edge of the circuit board main body 321, and since the extension leg 3322 may be formed by other means, such as injection molding, the thickness of the extension leg 3322 may be smaller relative to the wall thickness of the base main body 331, and the chord edge portion 121 of the edge-cut lens barrel 12 is also a narrowing direction, so that the two match with each other, and thus the overall size of the camera module 100 is smaller.

Of course, as can be seen from the above, compared to the manner of the conventional COB technology, the base 33 can take many advantages in the integral forming manner, including the advantage of making the size of the base 33 inwardly reduced. That is, in the case of the absence of the supplementary support member 332, the lens 10 matches with the base 33 having a reduced volume, and the size of the camera module 100 can still be reduced.

On the other hand, for the manner of integral forming, the size of the base 33 is reduced, and the lens 10 and/or the lens carrying element 20 need to be mounted to the base 33. Therefore, the base 33 needs to provide an enough mounting area, and thus the size of the base 33 cannot be too small compared to the conventional larger-sized lens 10, that is, the miniaturized size of the base 33 is limited by the size of the conventional lens 10. In the present invention, the edge-cut design of the lens 10 causes the overall size of the lens 10 to be reduced, and the mounting size requirement of the base 33 is reduced, so that the base 33 can be further miniaturized. It can be seen that the lens 10 and the base 33 or the photosensitive assembly 30 match with each other in design, so that the overall size of the camera module 100 can be further miniaturized, while the effect achieved by separately miniaturizing the lens 10 or separately miniaturizing the photosensitive assembly 30 is a bit worse.

In this embodiment of the present invention, the base main body 331 has an inner side wall having an inclined angle to facilitate mold manufacturing and reduce stray light reflected to the photosensitive chip 31. For example, when the side wall is at a vertical angle, the incident angle of light reaching the base main body 331 is large, so that the reflection angle of the light is large, and it is relatively easy to reflect toward the inside, namely, reflecting toward the position of the photosensitive chip 31. When the inner side wall is inclined, the incident angle of the light is small, and for the light incident in the same direction, the direction of the reflected light is offset from the position of the photosensitive chip 31, so that the inclined arrangement is helpful to reduce the interference of stray light. The magnitude of the inclination angle can be set as demanded. Of course, in some embodiments, the inner side wall of the base main body 331 may be vertically disposed, that is, the inclination angle is not present.

Different modified implementations of the lens 10 in accordance with the first preferred embodiment of the present invention are as shown in FIGS. 7 to 9. In these implementations, it is schematically showed that the chord edge 1141 and the circular edge 1142 of the edge-cut lens sheet 11 are changed.

For example, in the implementation shown in FIG. 7, the edge-cut lens sheet of the lens 10, namely, the fourth lens sheet 114, includes two chord edges 1141 and two circular edges 1142. That is, the edge-cut lens sheet is narrowed at two edge positions relative to a round lens sheet. In particular, the two chord edges 1141 may be symmetrically distributed.

Correspondingly, the edge-cut lens barrel 12 includes two chord edge portions 121 and two circular edge portions 122. In particular, the two chord edge portions 121 are symmetrically disposed. Compared to the conventional round lens barrel, the edge-cut lens barrel 12 is designed to be edge-cut in two directions, so that the two positions of the lens 10 are narrowed.

In particular, the curvature of the two chord edges 1141 of the fourth lens sheet 114 is zero, and the curvature of the two circular edges 1142 is greater than 0. That is, the two chord edges 1141 are straight lines, and the two circular edged 1142 are circular arc lines.

Further, the outer edges of the chord edge portion 121 and the circular edge portion 122 of the edge-cut lens barrel 12 correspond to the chord edge 1141 and the circular edge 1142, respectively.

In the implementation shown in FIG. 8, the edge-cut lens sheet of the lens 10, namely, the fourth lens sheet 114, includes three chord edges 1141 and three circular edges 1142. That is, the edge-cut lens sheet is narrowed at three edge positions relative to a round lens sheet. In particular, the three chord edges 1141 may be symmetrically distributed.

Correspondingly, the edge-cut lens barrel 12 includes three chord edge portions 121 and three circular edge portions 122. In particular, the three chord edge portions 121 are symmetrically disposed. Compared to the conventional round lens barrel, the edge-cut lens barrel 12 is designed to be edge-cut in three directions, so that the three positions of the lens 10 are narrowed.

In particular, the curvature of the three chord edges 1141 of the fourth lens sheet 114 is zero, and the curvature of the three circular edges 1142 is greater than 0. That is, the three chord edges 1141 are straight lines, and the three circular edged 1142 are circular arc lines.

Further, the outer edges of the chord edge portion 121 and the circular edge portion 122 of the edge-cut lens barrel 12 correspond to the chord edge 1141 and the circular edge 1142, respectively.

In the implementation shown in FIG. 9, the edge-cut lens sheet of the lens 10, namely, the fourth lens sheet 114, includes four chord edges 1141 and four circular edges 1142. That is, the edge-cut lens sheet is narrowed at four edge positions relative to a round lens sheet. In particular, the four chord edges 1141 may be symmetrically distributed.

Correspondingly, the edge-cut lens barrel 12 includes four chord edge portions 121 and four circular edge portions 122. In particular, the four chord edge portions 121 are symmetrically disposed. Compared to the conventional round lens barrel, the edge-cut lens barrel 12 is designed to be edge-cut in four directions, so that the four positions of the lens 10 are narrowed.

In particular, the curvature of the four chord edges 1141 of the fourth lens sheet 114 is zero, and the curvature of the four circular edges 1142 is greater than 0. That is, the four chord edges 1141 are straight lines, and the four circular edged 1142 are circular arc lines.

Further, the outer edges of the chord edge portion 121 and the circular edge portion 122 of the edge-cut lens barrel 12 correspond to the chord edge 1141 and the circular edge 1142, respectively.

Different modified implementations of the lens 10 in accordance with the first preferred embodiment of the present invention are as shown in FIGS. 10 and 11. In these implementations, it is schematically showed that the number of the edge-cut lens sheets in the lens 10 may be changed.

In the implementation shown in FIG. 10, two lens sheets 11 in the lens 10 are edge-cut. As shown in the figure, they are a third lens sheet 113 and a fourth lens sheet 114, respectively, and the third lens sheet 113 and the fourth lens sheet 114 each include a chord edge 1141 and a circular edge 1142. Of course, in other embodiments of the present invention, the two edge-cut lens sheets 11 may also be any other two lens sheets 11. The number of the chord edges 1141 and the number of the circular edges 1142 may also be other numbers, such as the numbers shown in FIGS. 7 to 9. Correspondingly, the inner side shape of the edge-cut lens barrel 12 changes according to the shape of the lens sheets 11.

In the implementation shown in FIG. 11, three lens sheets 11 in the lens 10 are edge-cut. As shown in the figure, they are a second lens sheet 112, a third lens sheet 113 and a fourth lens sheet 114, respectively, and the second lens sheet 112, the third lens sheet 113 and the fourth lens sheet 114 each include a chord edge 1141 and a circular edge 1142. Of course, in other embodiments of the present invention, the three edge-cut lens sheets 11 may also be any other three lens sheets 11. The number of the chord edges 1141 and the number of the circular edges 1142 may also be other numbers, such as the numbers shown in FIGS. 7 to 9. Correspondingly, the inner side shape of the edge-cut lens barrel 12 changes according to the shape of each of the lens sheets 11.

Figure 12:
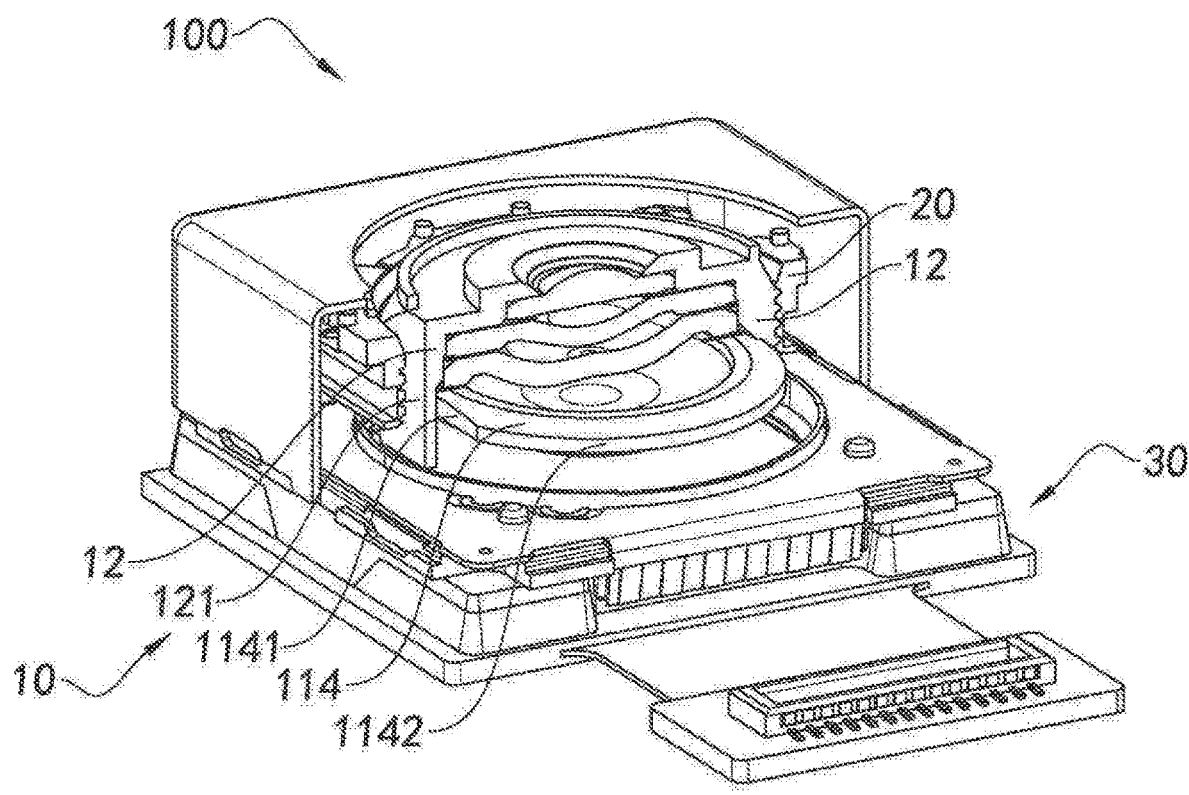
FIG. 12 is a schematic view of a partially modified embodiment in accordance with the first preferred embodiment of the present invention.

In the first preferred embodiment described above, the lens 10 may be attached to the lens carrying element 20 by adhesive bonding, and in particular, the edge-cut lens barrel 12 is externally flat without a threaded structure. As shown in FIG. 12, in another modified implementation of the camera module 100 according to the first preferred embodiment of the present invention, the edge-cut lens barrel 12 externally has a thread, that is, the lens 10 may be applied to the lens carrying element 20 having a threaded structure after being edge-cut.

Figure 13:
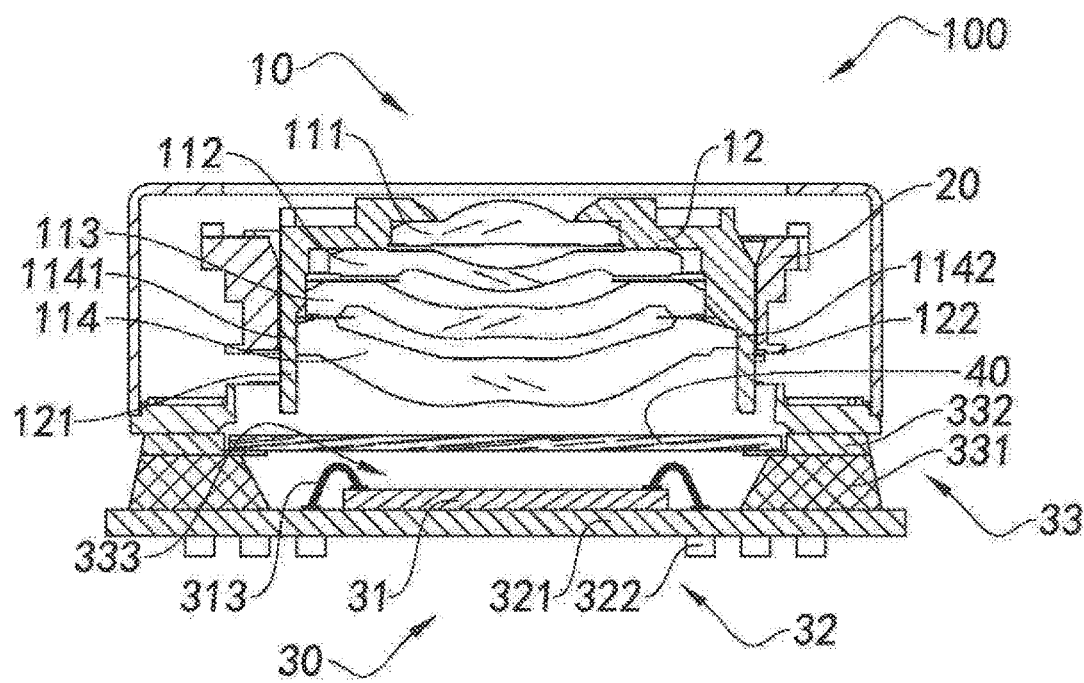
FIG. 13 is a schematic view of a camera module in accordance with a second preferred embodiment of the present invention.

A camera module 100 according to the second preferred embodiment of the present invention is as shown in FIG. 13. In this embodiment, the electronic element 322 is disposed at the bottom of the circuit board body 321. Therefore, it is not necessary to reserve the installation space of the electronic element 322 on the top of the circuit board main body 321, so that the design of the base main body 331 and the supplementary support member 332 can be more flexible, the requirements of the circuit board main body 321 are continuously reduced, and the lens 10 can be designed to be edge-cut accordingly, so that the overall size of the camera module 100 is reduced.

Further, in some implementations, it is showed that the base main body 331 integrally packages the electronic element 322 located on the back surface of the circuit board body 321 so that the illustrated electronic element 322 is encapsulated.

Figure 14:
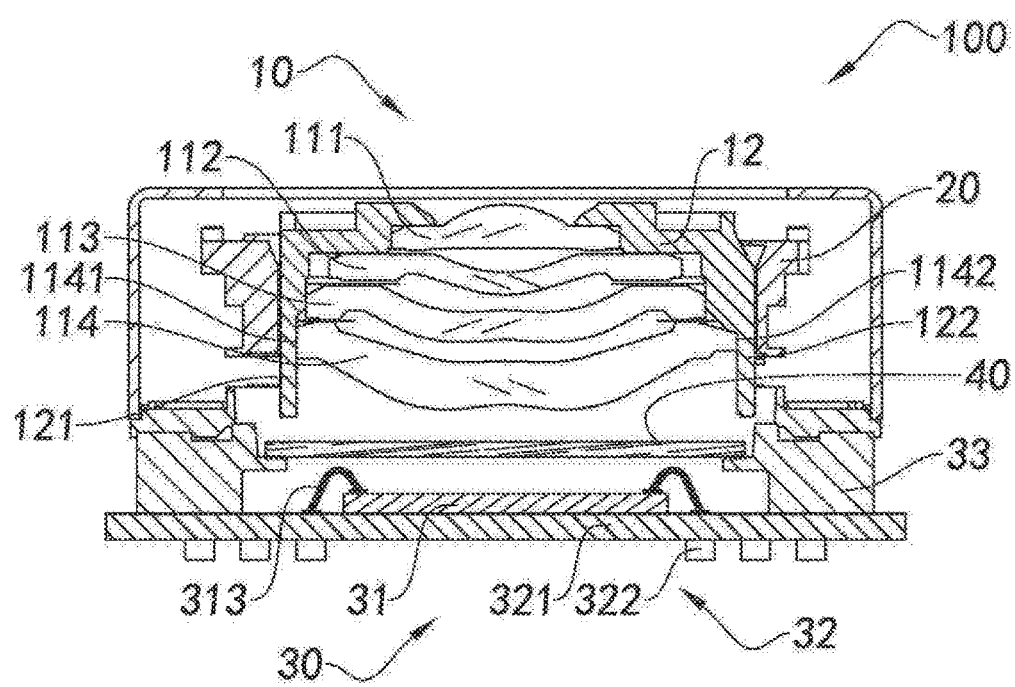
FIG. 14 is a schematic view of a camera module in accordance with a third preferred embodiment of the present invention.

A camera module 100 according to the third preferred embodiment of the present invention is as shown in FIG. 14. In this way, the electronic element 322 is disposed at the back surface of the circuit board body 321. The base 33 is mounted to the circuit board main body 321 by adhesive bonding, that is, a conventional base can be applied to such an embodiment. However, since it is not necessary to reserve the spatial position of the electronic element 322, the size of the base 33 can be reduced, and the lens 10 can be designed to be edge-cut, so that the size of the camera module 100 is reduced.

Further, in some embodiments, a molded base may be provided to encapsulate the electronic element 322. That is, the electronic element located on the back surface of the circuit board main body 321 is packaged by means of integral forming, thereby making the assembly thereof more stable.

Figure 15:
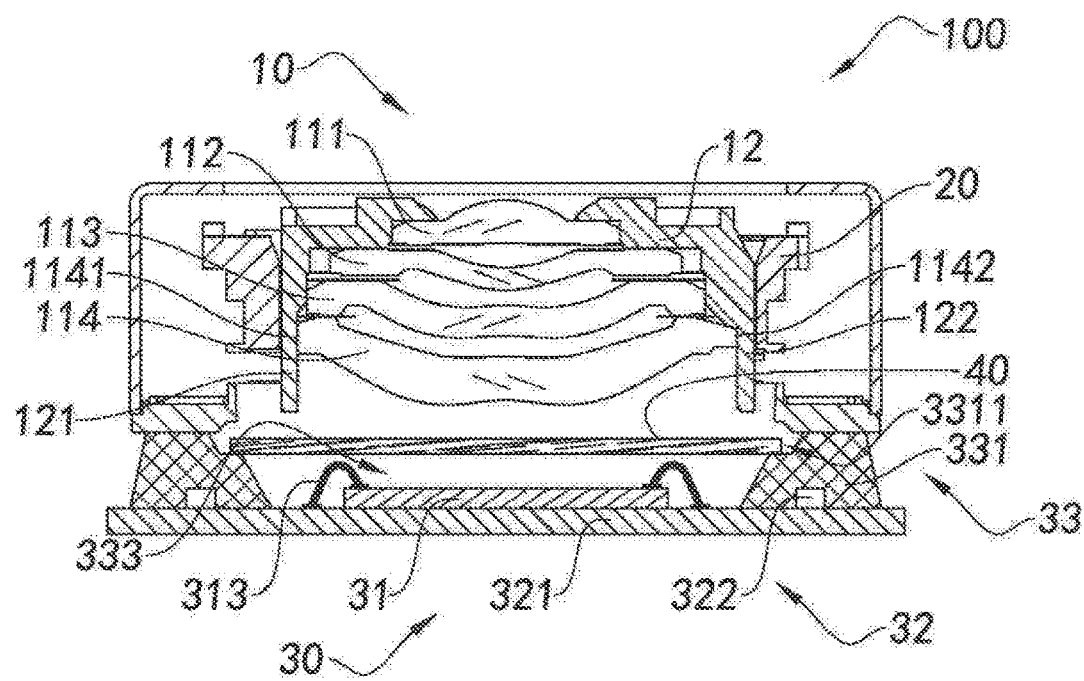
FIG. 15 is a schematic view of a camera module in accordance with a fourth preferred embodiment of the present invention.

A camera module 100 according to the fourth preferred embodiment of the present invention is shown in FIG. 15. In this way, the base 33 includes a base main body 331 and has a light window 333. The base main body 331 is integrally formed on the circuit board 32 to form the light window 333. In this embodiment, the base main body 331 is a closed structure, that is, the base main body 331 does not have a notch 3312. The base main body 331 has a mounting groove 3311, and the filter element 40 is mounted in the mounting groove 3311.

Figure 16:
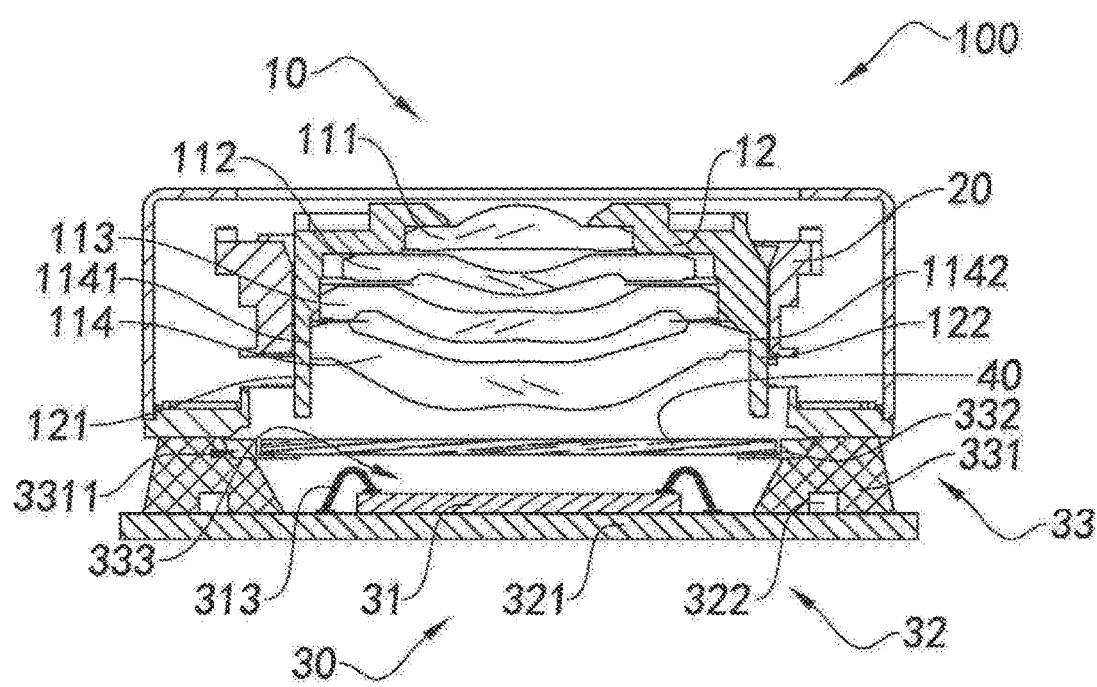
FIG. 16 is a schematic view of a camera module in accordance with a fifth preferred embodiment of the present invention.

A camera module 100 according to the fifth preferred embodiment of the present invention is shown in FIG. 16. In this way, the base 33 includes a base main body 331 and has a supplementary support member 332. The base main body 331 is integrally formed on the circuit board 32 to form the light window 333. In this embodiment, the base main body 331 is a closed structure, that is, the base main body 331 does not have a notch 3312. The base main body 331 has a mounting groove 3311 in which the supplementary support member 332 is mounted, and the filter element 40 is mounted to the supplementary base 33. Unlike the first preferred embodiment, in this way, the supplementary support member 332 does not have the extension leg 3322, that is, the supplementary support member 332 is not directly connected to the circuit board 32.

Further, the supplementary support member 332 is sunk in the light window 333 so that the filter element 40 is closer to the photosensitive chip 31, and the back focus of the camera module 100 is reduced.

Figure 17:
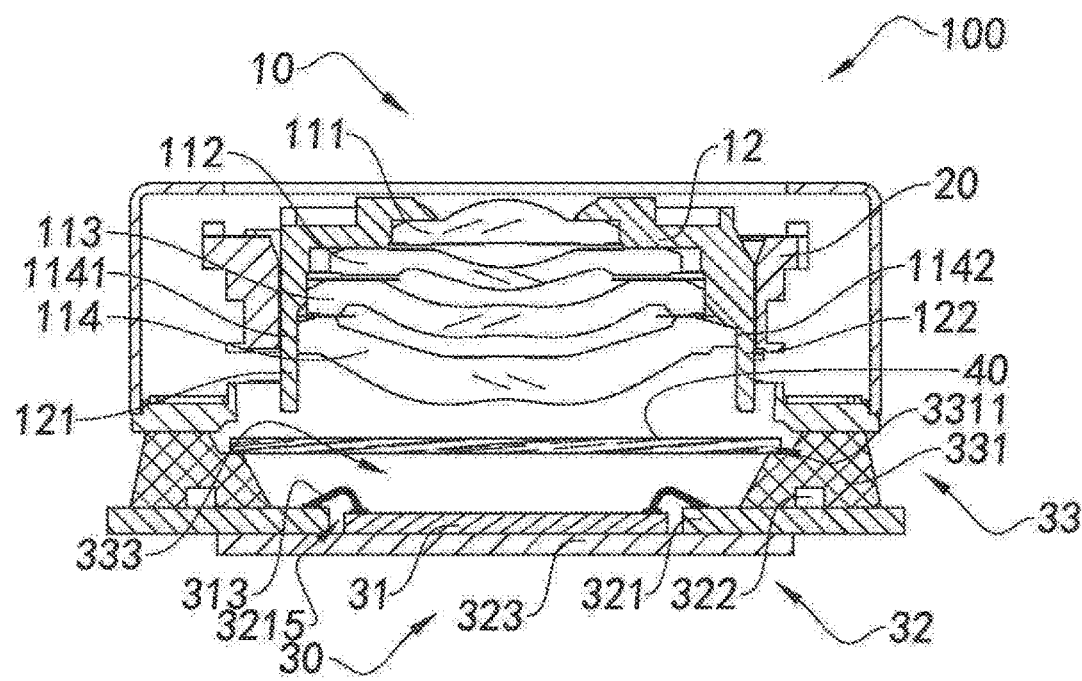
FIG. 17 is a schematic view of a camera module in accordance with a sixth preferred embodiment of the present invention.

A schematic view of a camera module 100 in accordance with the sixth preferred embodiment of the present invention is as shown in FIG. 17. Unlike the first embodiment, the circuit board main body 321 has a sinking region 3211, and the photosensitive chip 31 is sunkenly disposed in the sinking region 3215, to reduce the relative height of the photosensitive chip 31 and the circuit board main body 321.

The sinking region 3215 may be implemented as a groove or a through hole. That is, the spaces on both sides of the circuit board main body 321 may be made to communicate or not to communicate. When the sinking region 3215 is a groove, the photosensitive chip 31 is disposed at the bottom of the groove, and is electrically connected to the circuit board main body 321 through the electrical connection element 313. The outer end of the electrical connection element 313 may be electrically connected to the bottom of the groove or may be electrically connected to the outer side of the sinking region 3215, and the present invention is not limited in this aspect. Further, the top surface of the photosensitive chip 31 may be consistent with the top surface of the circuit board main body 321 or higher than the top surface of the circuit board main body 321 or lower than the top surface of the circuit board main body 321. That is, the present invention does not limit the sinking depth.

Further, in the figure of this embodiment of the present invention, the sinking region 3215 is a through hole, that is, both sides of the circuit board 32 communicate through the through hole. The circuit board 32 of the camera module 100 includes a bottom plate 323 stacked and disposed on the bottom of the circuit board main body 321 to support the photosensitive chip 31 and enhance the structural strength of the circuit board main body 321. That is, the photosensitive chip 31 is sunk and disposed in the sinking region 3215, and is supported by the bottom plate 323. The photosensitive chip 31 is electrically connected to the circuit board main body 321 through the electrical connection element 313.

In some embodiments, the bottom plate 323 may be a metal plate disposed on the bottom of the circuit board main body 321 by attaching.

Figure 18:
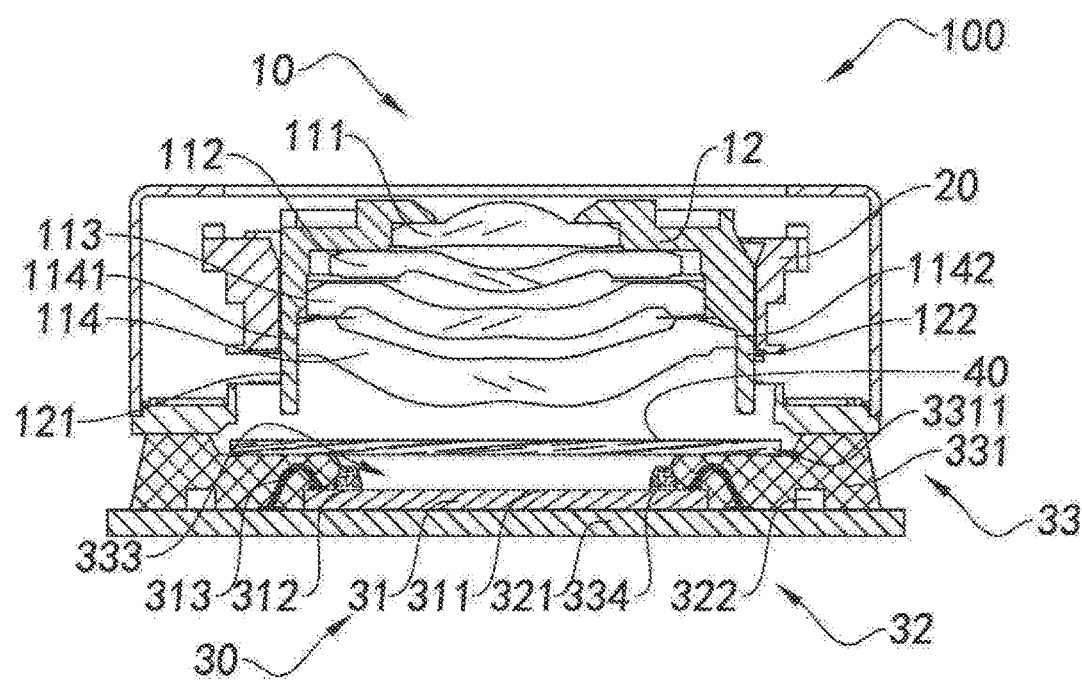
FIG. 18 is a schematic view of a camera module in accordance with a seventh preferred embodiment of the present invention.

A camera module 100 according to the seventh preferred embodiment of the present invention is shown in FIG. 18.

The base 33 of the photosensitive assembly 30 of the camera module 100 integrally packages at least a portion of the non-photosensitive region 312 of the photosensitive chip 31. In other words, the base 33 packages the circuit board 32 and the photosensitive chip 31 by means of integral forming so that the photosensitive chip 31 is stably fixed and the formable region of the base 33 is increased. The base 33 encapsulates the electrical connection element 313.

It is worth mentioning that, compared to the above manner in the first preferred embodiment described above that the base 33 is only formed on the circuit board, the manner of molding on the photosensitive chip allows the range in which the base 33 can be integrally formed to be extended to the non-photosensitive region 312 of the photosensitive chip 31, thereby increasing the connection area of the bottom portion of the base 33 without affecting the normal photosensitive operation of the photosensitive element 31. As a result, the base 33 can be more stably connected to the circuit board 32 and the photosensitive element 31, and the top portion can provide a larger mountable area for other components, such as the lens 10, the lens carrying element 20, etc. Also, the electrical connection element 313 is encapsulated by the base 33, thereby avoiding external interference with the electrical connection element 313, and preventing the electrical connection element 313 from oxidizing or being dust contaminated to affect the imaging quality of the camera module 100.

In this implementation, the base 33 includes a support element 334 for supporting the mold in the manufacturing process to prevent the circuit board or the photosensitive element 31 from being damaged. That is, in the manufacturing process, the manufacturing mold can be abutted against the support element 334, so that the mold does not directly contact the circuit board or the photosensitive element 31, and the molding material is prevented from overflowing inwardly.

Further, the support element 334 may have a ring structure, which is consistent with the shape of the base main body 331. The support element 334 has elasticity, and is, for example, but not limited to, a glue coating or a rubber pad.

Figure 19:
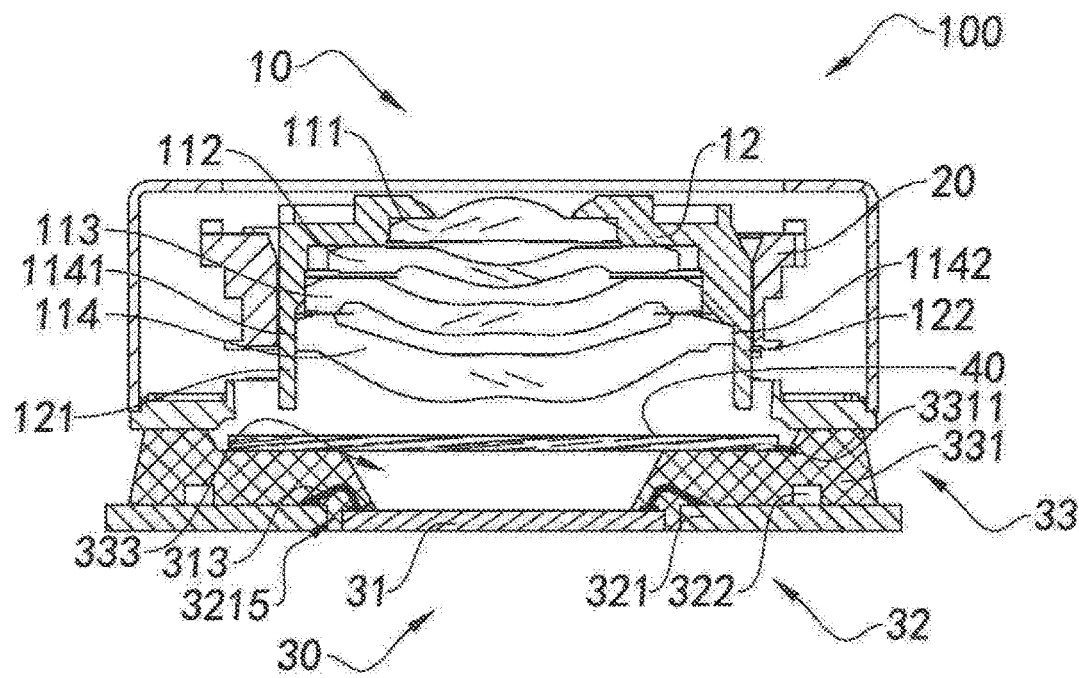
FIG. 19 is a schematic view of a camera module in accordance with an eighth preferred embodiment of the present invention.

A camera module 100 according to the eighth preferred embodiment of the present invention is shown in FIG. 19.

In this embodiment, the circuit board main body 321 has a sinking region 3215, and the photosensitive chip 31 is sunkenly disposed in the sinking region 3215, to reduce the relative height of the photosensitive chip 31 and the circuit board main body 321.

The sinking region 3215 may be implemented as a groove or a through hole. That is, both sides of the circuit board main body 321 may be made to communicate or not to communicate. When the sinking region 3215 is a groove, the photosensitive chip 31 is disposed at the bottom of the groove, and is electrically connected to the circuit board main body 321 through the electrical connection element 313. The outer end of the electrical connection element 313 may be electrically connected to the bottom of the groove or may be electrically connected to the outer side of the sinking region 3215, and the present invention is not limited in this aspect. Further, the top surface of the photosensitive chip 31 may be consistent with the top surface of the circuit board main body 321 or lower than the top surface of the circuit board main body 321 or higher than the top surface of the circuit board main body 321. That is, the present invention does not limit the sinking depth.

Further, in the figure of this embodiment of the present invention, the sinking region 3215 is a through hole, that is, both sides of the circuit board 32 communicate through the through hole.

The base 33 of the photosensitive assembly 30 of the camera module 100 integrally packages at least a portion of the non-photosensitive region 312 of the photosensitive chip 31. In other words, the base 33 packages the circuit board and the photosensitive chip 31 by means of integral forming so that the photosensitive chip 31 is stably fixed and the formable region of the base 33 is increased. The base 33 encapsulates the electrical connection element 313.

It is worth mentioning that, compared to the above manner in the first preferred embodiment described above that the base 33 is only formed on the circuit board, the manner of molding on the photosensitive chip allows the range in which the base 33 can be integrally formed to be extended to the non-photosensitive region 312 of the photosensitive chip 31, thereby increasing the connection area of the bottom portion of the base 33 without affecting the normal photosensitive operation of the photosensitive element 31. As a result, the base 33 can be more stably connected to the circuit board 32 and the photosensitive element 31, and the top portion can provide a larger mountable area for other components, such as the lens 10, the lens carrying element 20, etc. Also, the electrical connection element 313 is encapsulated by the base 33, thereby avoiding external interference with the electrical connection element 313, and preventing the electrical connection element 313 from oxidizing or being dust contaminated to affect the imaging quality of the camera module 100.

In this embodiment, the photosensitive chip 31 and the electrical connection element 313 are integrally packaged by the base 33, so that the photosensitive chip 31 can be fixed by the base 33. A bottom plate 323 may be disposed at the bottom of the circuit board 32, or the bottom plate 323 may not be disposed.

Figure 20:
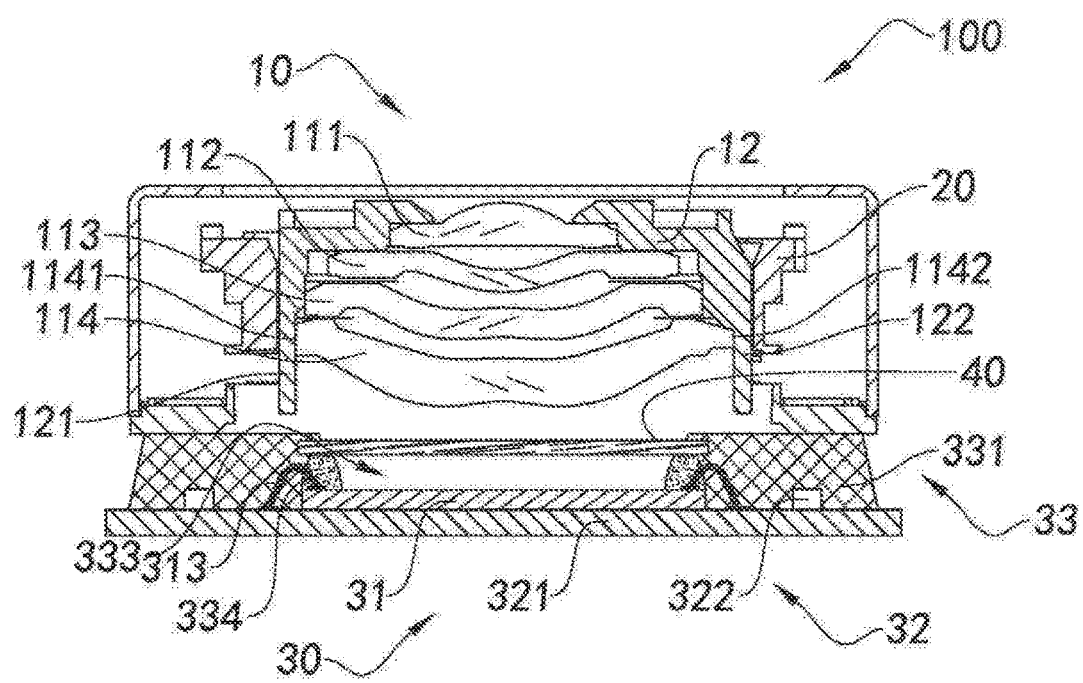
FIG. 20 is a schematic view of a camera module in accordance with a ninth preferred embodiment of the present invention.

A schematic view of a camera module 100 in accordance with the ninth preferred embodiment of the present invention is as shown in FIG. 20.

The filter element 40 is correspondingly disposed on the photosensitive assembly 30, and the base 33 combines the photosensitive assembly 30 and the filter element 40 into one body after being formed to form an integral structure. That is, unlike the above embodiment, the filter element 40 is disposed on the base 33 by means of integral forming, it can also be disposed on the base 33 by a different manner, such as an adhesive bonding manner.

The filter element 40 is correspondingly disposed on the photosensitive assembly 30 to form at least one sealed space between the filter element 40 and the photosensitive assembly 30, wherein the photosensitive region of the photosensitive chip 31 of the photosensitive assembly 30 is located in the sealed space, respectively, so that the molding material for forming the base 33 does not enter the sealed space in a process of performing molding to form the base 33, and thus the base 33 is formed only outside the sealed space, and wherein the base 33 encapsulates a portion of the circuit board 32 and a portion of the filter element 40 after being formed, and the base 33 has the light window 333, the photosensitive region of the photosensitive chip 31 corresponding to the light window 333, so that the light window 333 provides a light passage for the lens 10 and the photosensitive chip 31.

Figure 21:
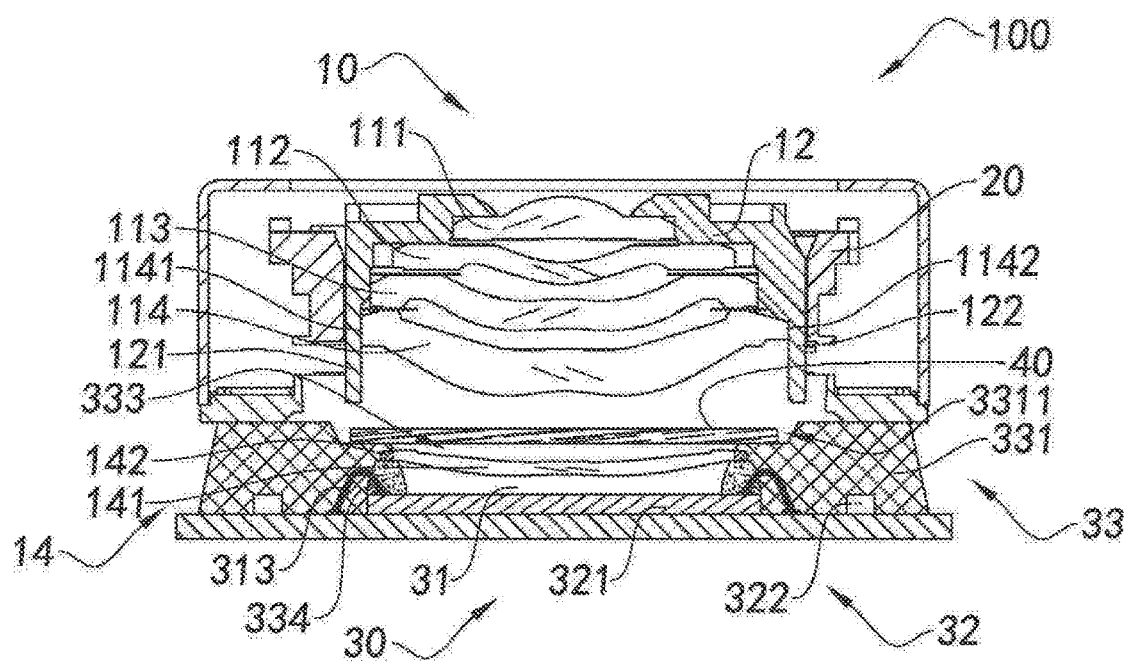
FIG. 21 is a camera module in accordance with a tenth preferred embodiment of the present invention.

FIG. 21 is a camera module 100 in accordance with the tenth preferred embodiment of the present invention.

In this embodiment of the present invention, the photosensitive assembly 30 includes a blocking lens 14 disposed above the photosensitive chip 31, and the blocking lens 14 is integrally packaged by the base 33. Light reflected by an object enters the interior of the camera module 100 from the lens 10 and the blocking lens 14, and is subsequently received and photoelectrically converted by the photosensitive element 31 to obtain an image associated with the object. The arrangement of the blocking lens 14 can reduce the optical TTL (the distance from the plane of the lens 10 at the clear aperture of the lens 10 to the photosensitive plane of the chip), and thus further reduce the size of the camera module 100 without affecting its optical performance, meeting the demand of the electronic device for mounting the small-sized camera module 100. At the same time, the arrangement of the blocking lens 14 can also reduce stain sensitivity. For example, in one embodiment, stain sensitivity of 50% can be reduced.

In this preferred embodiment of the present invention, preferably, the blocking lens 14 is implemented as a lens sheet with the thermosetting property. That is, the blocking lens 14 is implemented as a thermoset lens sheet, so that the blocking lens 14 can withstand the ambient temperature in a molding process when the molding process is performed. For example, it can withstand a molding ambient temperature of 180° C. in a molding process of an embodiment. That is, the high temperature resistant and thermally hardened processed blocking lens 14 is connected to the support element 334 before the molding process and is placed in a mold with the circuit board 32 and the photosensitive chip 31. A cured molding material of fluid is molded around the outer surfaces of the support element 334 and the blocking lens 14 to integrally form the base 33, so that the base 33 can be integrally formed on the circuit board 32. That is, the base 33, the circuit board 32 and the blocking lens 14 form an integral structure. It should be understood by those skilled in the art that the blocking lens 14 of the present invention may be not only a thermoset lens sheet, but may also be a lens sheet 11 of other properties, and the present invention is not limited to this.

Further, the blocking lens 14 includes a lens main body 141 and a lens peripheral edge 142 disposed around the lens main body 141. Since the blocking lens 14 is a precision optical element, the edge of the lens main body 141 is relatively thin. The lens peripheral edge 142 disposed at the edge of the lens main body 141 and integrally connected is a thickened bracket design, and is capable of carrying the lens main body 141 to enable the lens main body 141 to be integrally molded to the base 33 in a mold while the optical performance of the lens main body 141 is not affected. That is, before the base 33 is formed, the lens peripheral edge 142 of the blocking lens 14 is disposed in the non-photosensitive region 312 of the photosensitive chip 31, and the lens main body 141 of the blocking lens 14 is disposed in the photosensitive path of the photosensitive chip 31 of the photosensitive assembly 30; and after the base 33 is formed, the base 33 encapsulates the circuit board 32, at least a portion of the non-photosensitive region 312 of the photosensitive chip 31, at least a portion of the support element 334, and the lens peripheral edge 142 of the blocking lens 14 to form the photosensitive assembly 30.

It is worth mentioning that the blocking lens 14 can also be the edge-cut lens sheet, thereby reducing the edge portion of the lens sheet 11 and reducing the area of the blocking lens 14, so that the shape of the blocking lens 14 corresponds to the shape of the lens 10.

Figure 22:
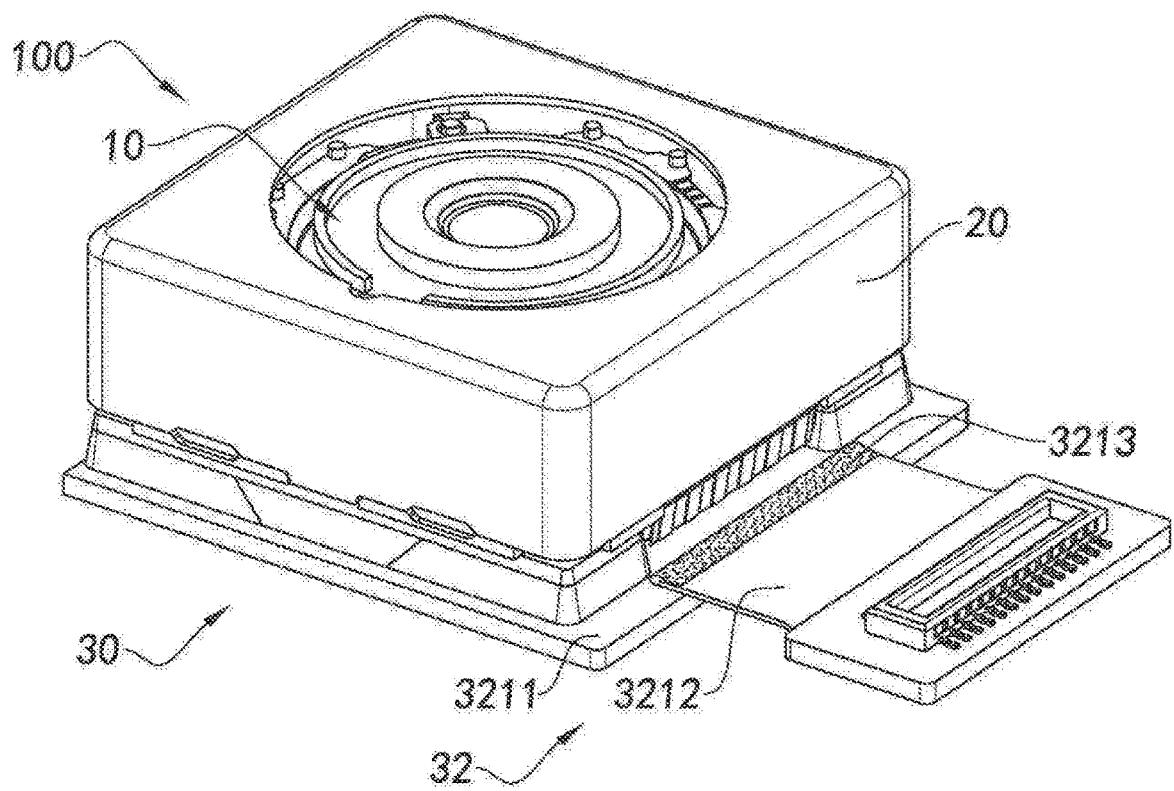
FIG. 22 is a camera module in accordance with an eleventh preferred embodiment of the present invention.

FIG. 22 is a camera module 100 in accordance with the eleventh preferred embodiment of the present invention.

The circuit board main body 321 includes a first board body 3211 and a second board body 3212, and the first board body 3211 and the second board body 3212 are fixedly connected by a connecting medium 3213. The first board body 3211 may be a hard board, the second board body 3212 may be a soft board, and the connecting medium 3213 may be an ACF conductive adhesive. The second board body 3212 may further include an interface terminal, such as a connector, to facilitate electrical connection to an electronic device.

In some embodiments, the base main body 331 is integrally formed on the first board body 3211, and the second board body 3212 is lap joined at one end of the first board body 3211. In the manufacturing process, the circuit board main body 321 may be first built by the first board body 3211 and the second board body 3212, and then integrally formed, or may be integrally formed on the first board body 3211, and then the second board body 3212 is electrically connected to the first board body 3211. For example, it is fixed to the first board body 3211 by the ACF conductive adhesive.

It is worth mentioning that although the second board body 3212 is connected to the upper portion of the first board body 3211 through the connecting medium 3213 as shown in FIG. 22, in other embodiments of the present invention, the second board body 3212 is connected to the bottom of the first board body 3211 through the connecting medium 3213, and the present invention is not limited in this aspect.

Figure 23:
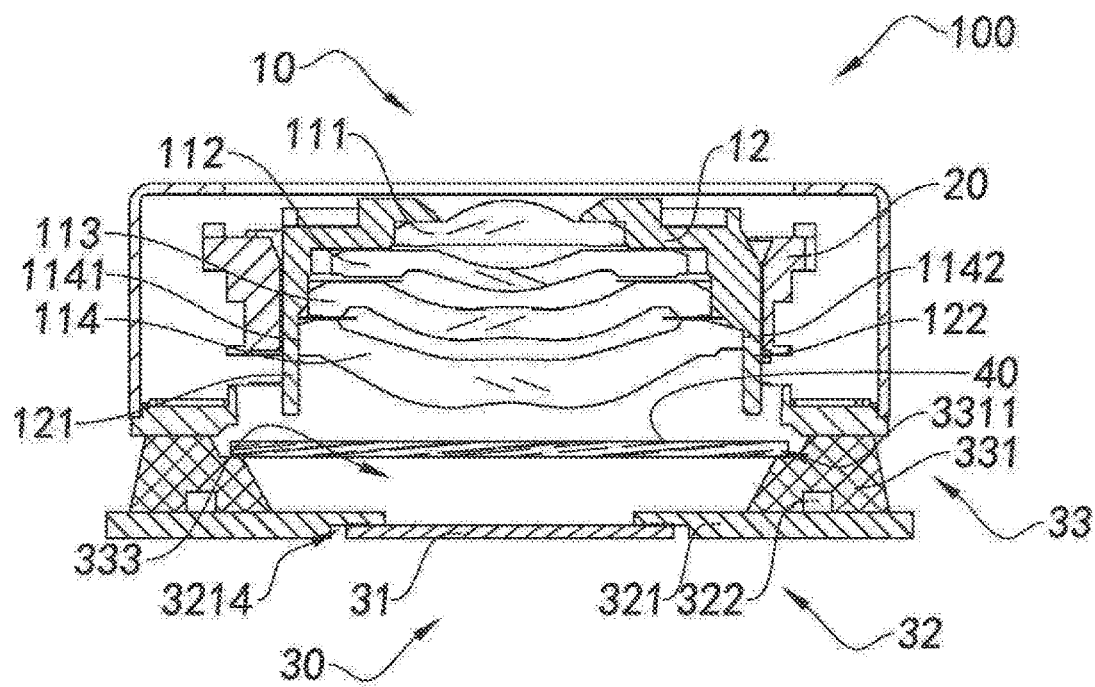
FIG. 23 is a camera module in accordance with a twelfth preferred embodiment of the present invention.

FIG. 23 is a camera module 100 in accordance with the twelfth preferred embodiment of the present invention.

In this embodiment, the circuit board main body 321 is provided with a flip-chip groove 3214, and the photosensitive chip 31 is mounted in the flip-chip groove 3214 in a flip-chip manner. That is, the photosensitive chip 31 is mounted on the board main body 321 by means of FC (Flip Chip). The flip-chip groove 3214 is opposite to the lens 10.

That is, the photosensitive chip 31 is mounted from below the circuit board main body 321 toward the circuit board main body 321 during the mounting process, and the photosensitive region of the photosensitive chip 31 performs a light sensing function through the flip-chip groove 3214.

Figure 24:
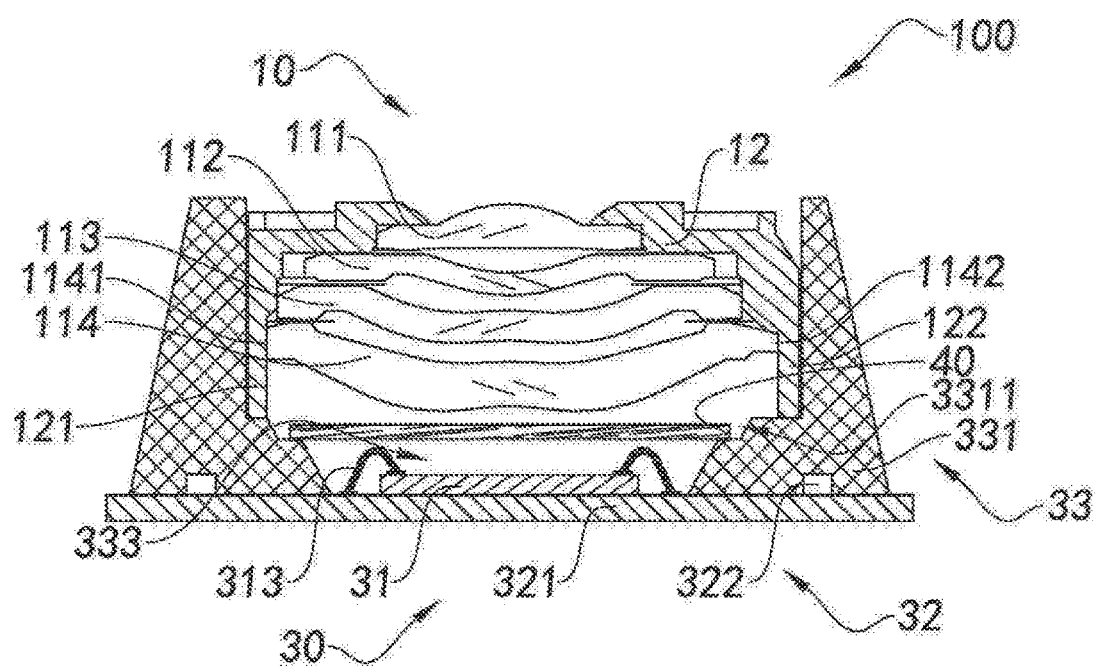
FIG. 24 is a schematic view of a camera module in accordance with a thirteenth preferred embodiment of the present invention.

FIG. 24 is a schematic view of a camera module in accordance with the fourteenth preferred embodiment of the present invention.

In this embodiment, the lens carrying element 20 is integrally connected to the base 33, and the lens 10 is adapted to be mounted to the lens carrying element 20 to form a fixed focus camera module.

Further, the lens carrying element 20 extends at least partially integrally upward from the base main body 331 to form a closed lens limiting space. That is, in this way, the base 33 includes the lens carrying element 20 to provide a limit and installation space for the lens 10.

In the manufacturing process, the base 33 with the lens carrying element 20 may be integrally formed on the circuit board 32 by using a mold. The lens carrying element may also be formed on the base main body by means of a secondary molding after the base main body is formed, and the present invention is not limited in this aspect.

Figure 25A:
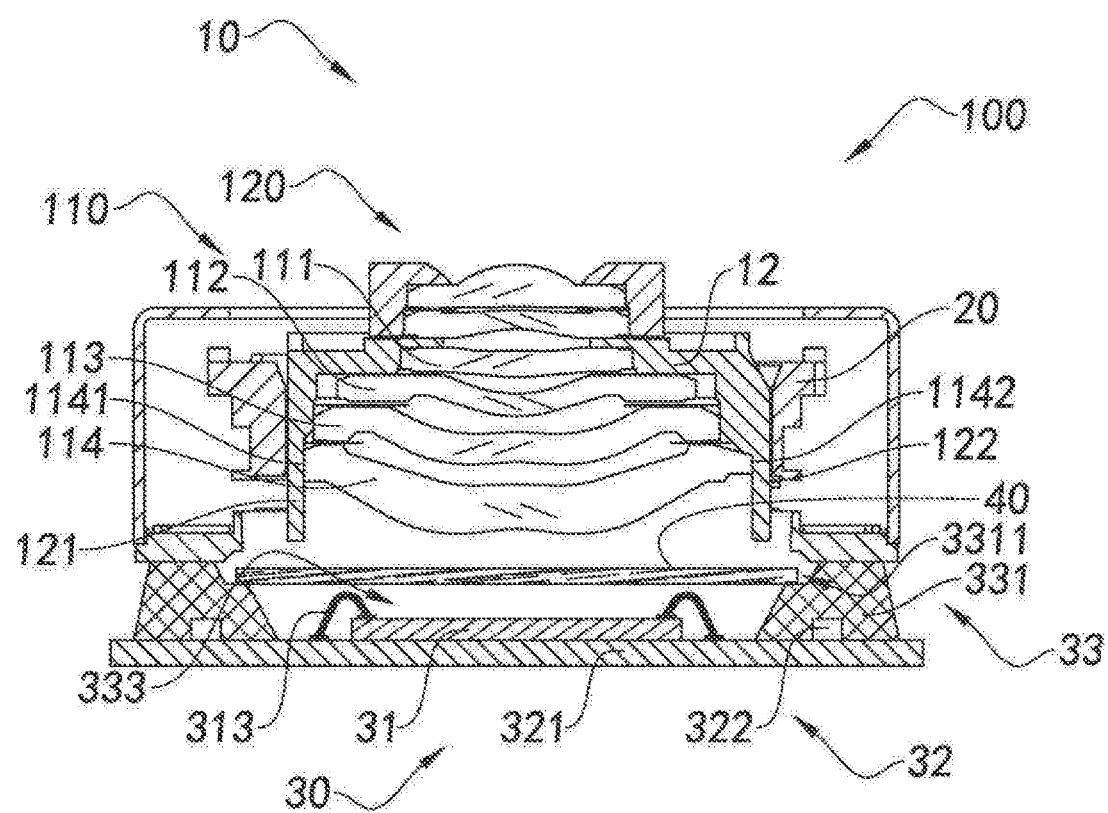
FIGS. 25A and 25B are schematic views of a camera module in accordance with a fourteenth preferred embodiment of the present invention.
Figure 25B:
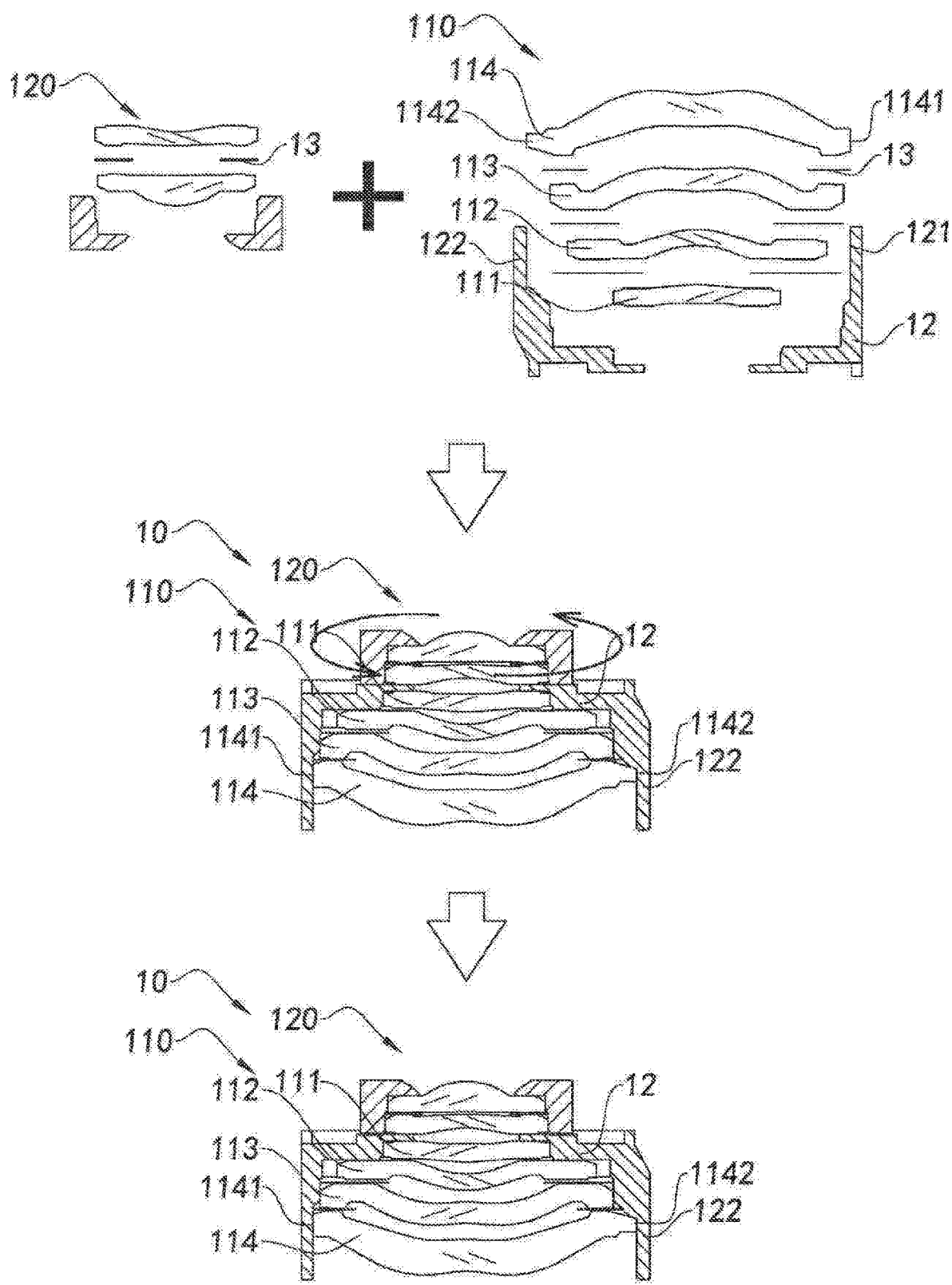

FIGS. 25A and 25B are schematic views of a camera module 100 in accordance with the fifteenth preferred embodiment of the present invention.

In this embodiment, the lens 10 includes at least two lens units, and the optical path of each of the lens units coincides with each other. Further, at least one lens unit of the respective lens units is an edge-cut lens unit. That is, at least one of the lens units includes at least one edge-cut lens sheet.

Specifically, in this implementation, the lens 10 includes two lens units, which are a first lens unit 110 and a second lens unit 120, respectively, and the first lens unit 110 and the second lens unit 120 are stacked and disposed from bottom to top. The first lens unit 110 is an edge-cut lens. The first lens unit 110 and the second lens unit 120 are independent of each other. That is, in the process of manufacturing, the first lens unit 110 and the second lens unit 120 may each be formed separately, and then two lens units are assembled, such as by glue bonding.

Further, the first lens unit 110 includes four lens sheets 11, which are a first lens sheet 111, a second lens sheet 112, a third lens sheet 113, and a fourth lens sheet 114, wherein the fourth lens sheet 114 is an edge-cut lens sheet. The first lens unit 110 includes an edge-cut lens barrel 12, and each of the lens sheets 11 is separately mounted in the lens barrel 12.

It is worth mentioning that in the manufacturing process of the lens, the optical axis consistency and the relative angular relationship between the lens sheets are some important factors affecting the image quality of the lens. When assembling each of the lens sheets and the lens, it is necessary to adjust the relative position, especially the position of the last lens sheet. The last lens sheet is typically assembled by pre-assembling the lens sheet and then adjusting the orientation of the lens sheet, such as rotating by a predetermined angle, so that the lens has better imaging. In this embodiment, the adjustment of the relative position of the lens sheet may be achieved by adjusting the second lens unit 120. That is, when the lens 10 is assembled, the first lens unit 110 and the second lens unit 120 are firstly assembled, next, the first lens unit 110 and the second lens unit 120 are pre-assembled, and then the second lens unit 120 or the first lens unit 110 is rotated to adjust the relative position of the first lens unit 110 and the second lens unit 120, so that the imaging quality of the lens 10 reaches the requirements of imaging quality or obtains a better imaging effect, that is, the purpose of adjusting the relative positional relationship between the lens sheets is achieved.

Figure 26A:
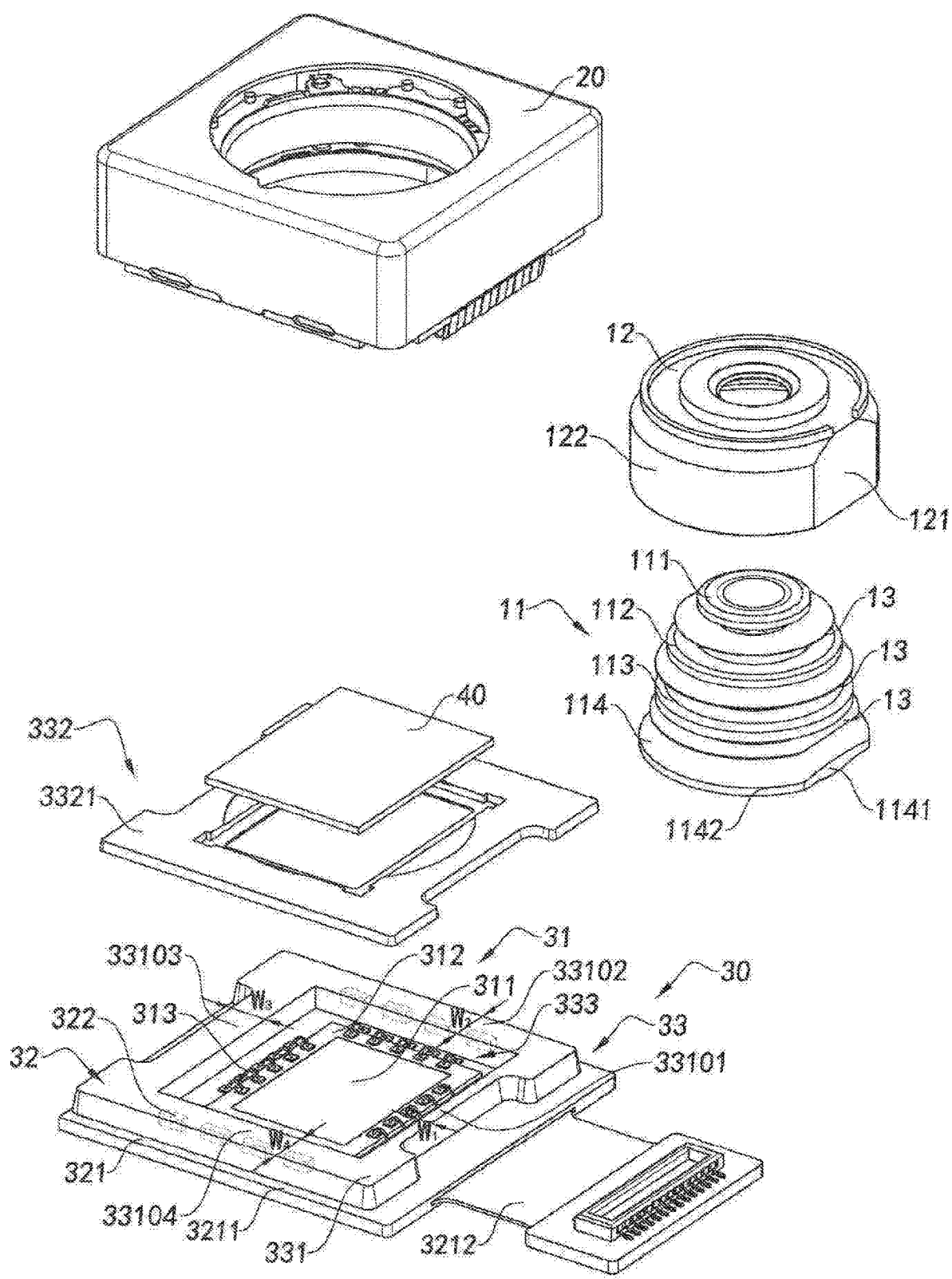
FIGS. 26A and 26B are schematic views of a camera module and a photosensitive assembly in accordance with a fifteenth preferred embodiment of the present invention.
Figure 26B:
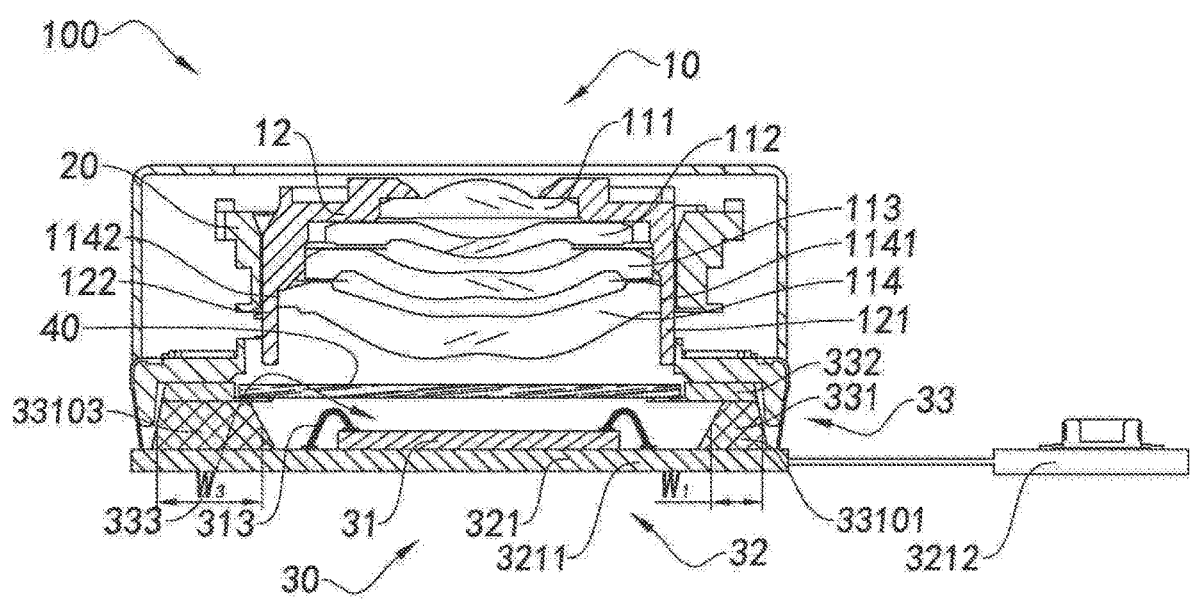

FIGS. 26A and 26B are schematic views of a camera module and a photosensitive assembly in accordance with a fifteenth preferred embodiment of the present invention. In this embodiment of the present invention, the circuit board main body 321 includes a first board body 3211 and a second board body 3212, and the second board body 3212 is electrically connected to the first board body 3211. The first board body 3211 may be a hard plate, and the second board body 3212 may be a soft plate. For example, the second board body 3212 may be electrically connected to the first board body 3211 in a press-fit manner, or may be electrically connected to the first board body 3211 through a conductive medium. The second board body 3212 may further include an interface terminal, such as a connector for electrically connecting to an electronic device. That is, the second board body 3212 is an electrical connection terminal for electrically connecting to other devices, such as an electronic device.

Further, the chord edge 1141 of the edge-cut lens sheet of the lens 10 and the chord edge portion 121 of the edge-cut lens barrel 12 are close to one side of the second board body 3212. Specifically, the base main body 331 includes four side edges, which are a first side edge 33101, a second side edge 33102, a third side edge 33103, and a fourth side edge 33104, respectively. The first side edge 33101, the second side edge 33102, the third side edge 33103, and the fourth side edge 33104 are sequentially and adjacently connected to each other in a closed manner to form the light window 333. The second side edge 33102 and the fourth side edge 33104 are located on two sides of the first side edge 33101, and the third side edge 33103 is opposite to the first side edge 33101.

A support member 3320 is mounted to the base main body 331, and the filter element 40 is mounted to the support member 3320 so that the filter element 40 is in the photosensitive path of the photosensitive chip 31.

In this embodiment of the present invention, the first side edge 33101 is adjacent to the second board body 3212, and the chord edge 1141 of the edge-cut lens sheet of the lens 10 is located at the direction of the first side edge 33101. That is, the chord edge 1141 of the edge-cut lens sheet and the chord edge portion 121 of the edge-cut lens barrel 12 are close to the interface terminal of the camera module 100.

Further, in this embodiment of The present invention, the electronic element 332 and the electrical connection element 313 are disposed on the second side edge 33102 and the fourth side edge 33104 of the base, making full use of the position of the circuit board main body 321 corresponding to the second side edge 33102 and the fourth side edge 33104. That is, the electronic element 332 and the electrical connection element 313 are disposed at positions of the first board body corresponding to the second side edge 33102 and the fourth side edge 33104. In particular, the electronic element 332 and the electrical connection element 313 are disposed in a direction perpendicular to the chord edge 1141 of the edge-cut lens sheet so that the size of the direction where the chord edge 1141 is located is maximally reduced. It is worth mentioning that, although in this embodiment of the present invention, the electrical connection element 313 and the electronic element 332 are disposed on opposite sides, in other embodiments of the present invention, the electrical connection element 313 and the electronic element 332 may be disposed on any two sides, three sides or four sides of the photosensitive chip 31 as desired. That is, the electronic element 332 and/or the electrical connection element 313 may be selectively disposed on one side edge, two side edges, and three side edges of the first side edge 33101, the second side edge 33102, the third side edge 33103, and the fourth side edge 33104 of the base main body 331, and the present invention is not limited in this aspect.

It is worth mentioning that, in some embodiments, the chord edge 1141 is located in the direction of the first side edge 33101, and the electronic element 332 is not disposed at a position corresponding to the first side edge 33101, so that the requirement of the width dimension of the first side edge 33101 is reduced, thereby increasing the possibility that the volume of the camera module is further reduced. That is, the arrangement positions of the electronic element 332 and the electrical connection element 313 may be adjusted according to the direction in which the chord edge 1141 is disposed.

Further, in this embodiment of the present invention, the width dimension of the first side edge 33101 is small, which is adapted to the edge-cut design of the lens 10, namely, adapting to the chord edge 1141 of the edge-cut lens sheet and the chord edge portion 121 of the edge-cut lens barrel 12. In particular, the width dimension W1 of the first side edge 33101 is smaller than the width dimensions W2, W4 of the second side edge 33102 and the fourth side edge 33104.

Figure 27A:
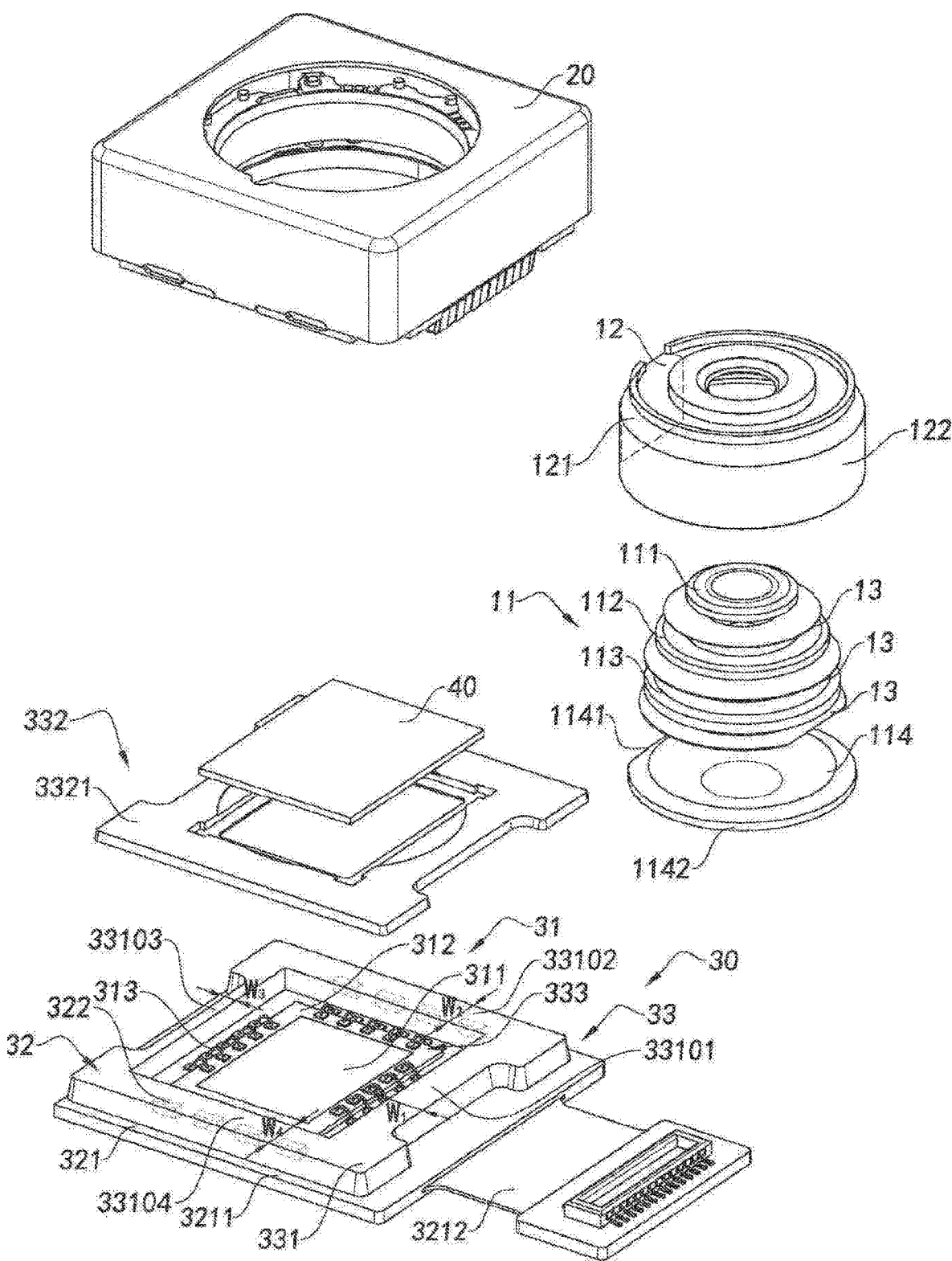
FIGS. 27A and 27B are schematic views of a camera module and a photosensitive assembly in accordance with a sixteenth preferred embodiment of the present invention.
Figure 27B:
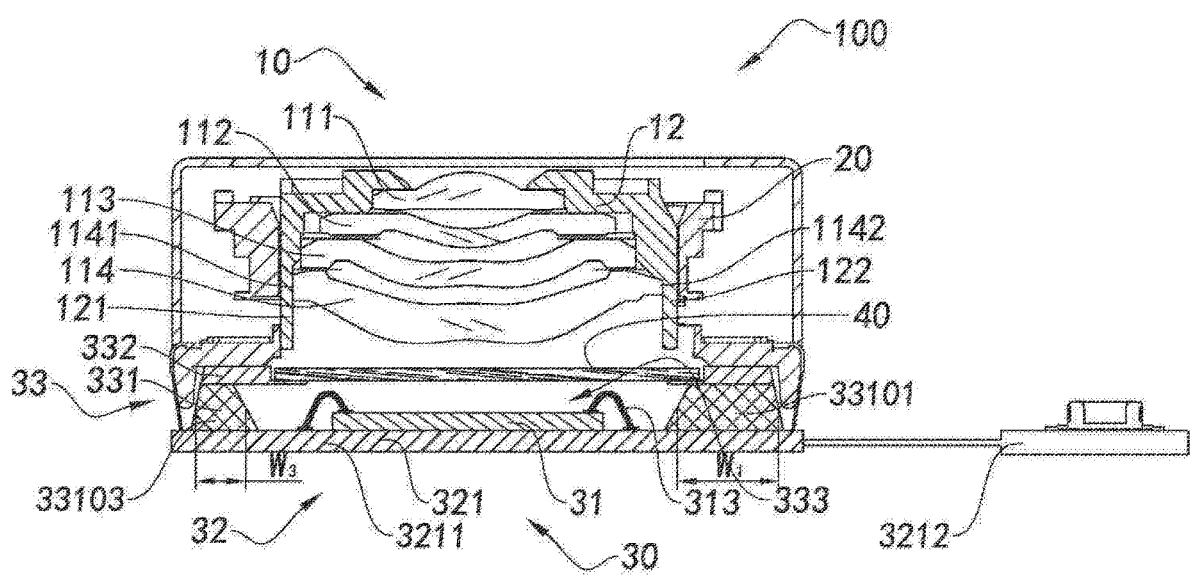

FIGS. 27A and 27B are schematic views of a camera module and a photosensitive assembly in accordance with a sixteenth preferred embodiment of the present invention. Unlike the fifteenth embodiment, in this embodiment of the present invention, the third side edge 33103 is away from the second board body 3212, the chord edge 1141 of the edge-cut lens sheet of the lens 10 and the chord edge portion 121 of the edge-cut lens barrel 12 are located in the direction of the third side 33101. That is, the chord edge 1141 of the edge-cut lens sheet and the chord edge portion 121 of the edge-cut lens barrel 12 are away from the electrical connection end of the camera module 100. That is, the chord edge 1141 of the edge-cut lens sheet is located on the side opposite to the second board body 3212.

Further, in this embodiment of the present invention, the width dimension of the third side edge 33103 is small, which is adapted to the edge-cut design of the lens 10, namely, adapting to the chord edge 1141 of the edge-cut lens sheet and the chord edge portion 121 of the edge-cut lens barrel 12. In particular, the width dimension W3 of the third side edge 33101 is smaller than the width dimensions W2, W4 of the second side edge 33102 and the fourth side edge 33104.

Figure 28A:
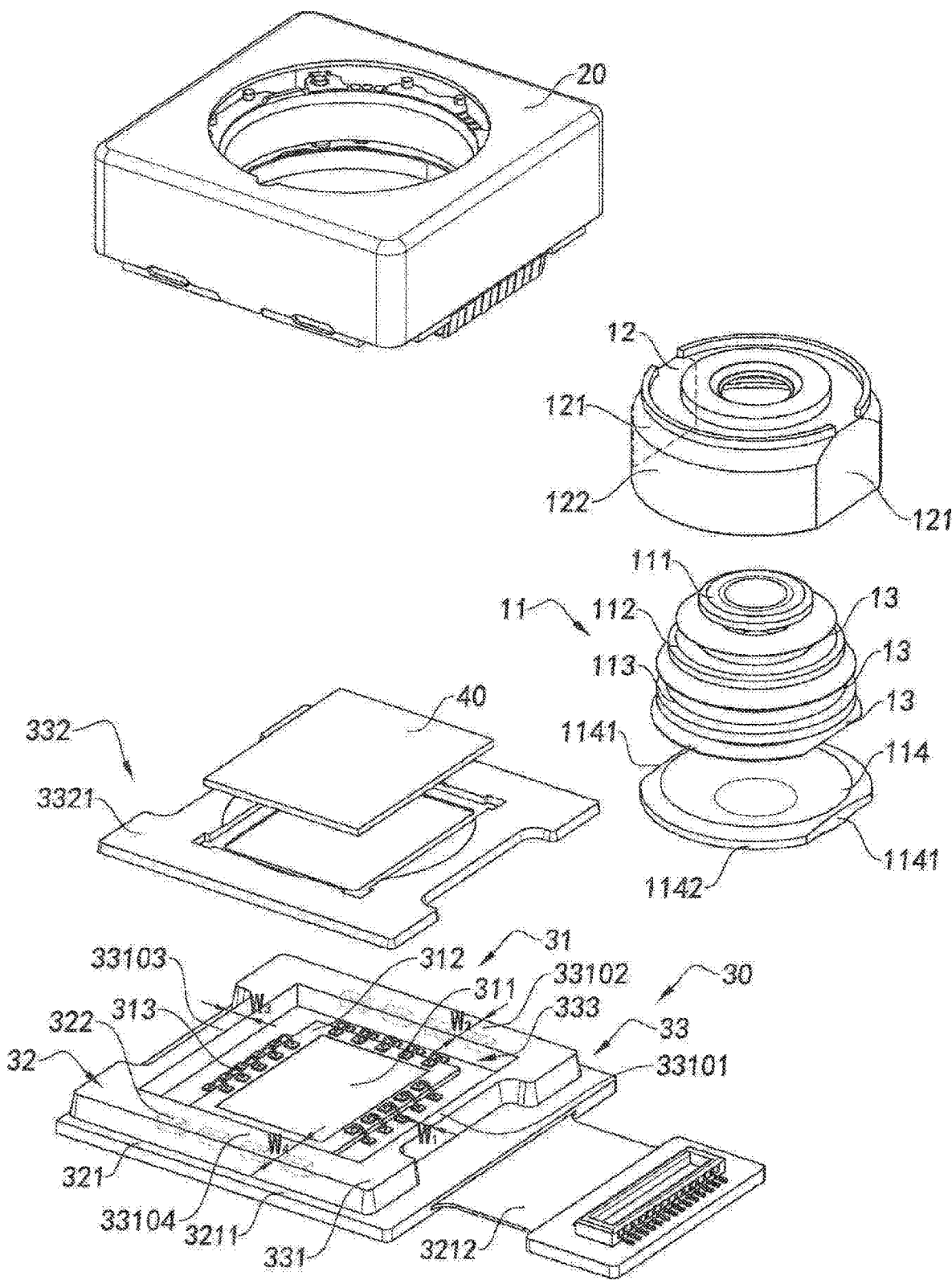
FIGS. 28A and 28B are schematic views of a camera module and a photosensitive assembly in accordance with a seventeenth preferred embodiment of the present invention.
Figure 28B:
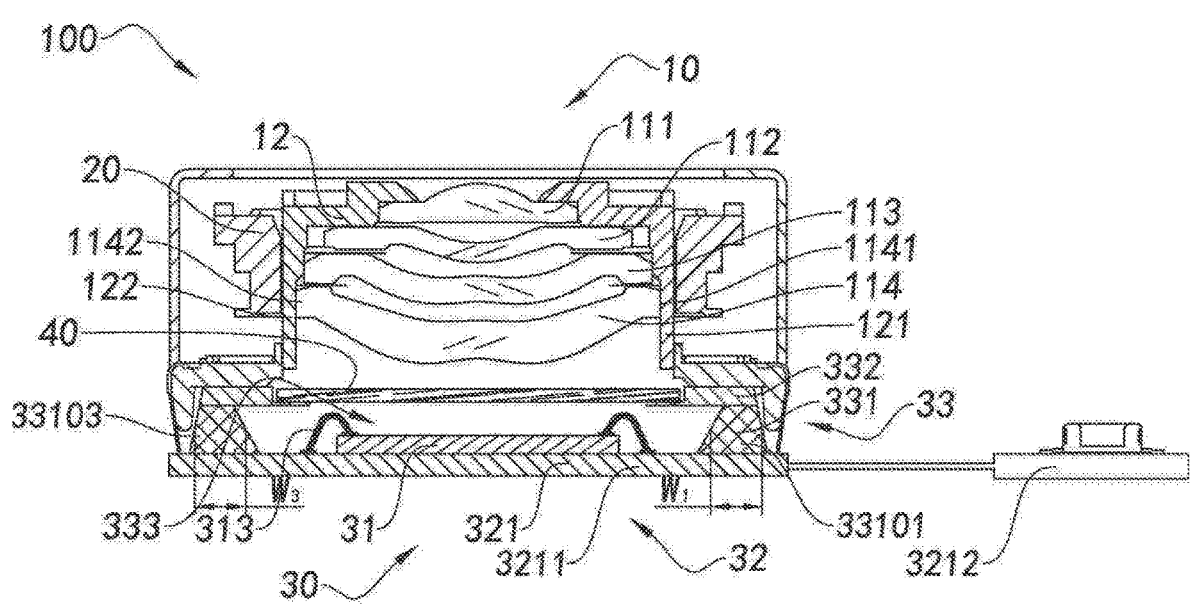

FIGS. 28A and 28B are schematic views of a camera module and a photosensitive assembly in accordance with a seventeenth preferred embodiment of the present invention. In this embodiment of the present invention, the edge-cut lens sheet includes two chord edges 1141, and the edge-cut lens barrel 12 includes two chord edge portions 121. One of the chord edges 1141 of the edge-cut lens sheet and one of the chord edge portions 121 of the edge-cut lens barrel 12 are located on the side close to the second board body 3212. The other of the chord edges 1141 of the edge-cut lens sheet and the other of the chord edge portions 121 of the edge-cut lens barrel 12 are located on the side away from the second board body 3212.

Further, one of the chord edges 1141 of the edge-cut lens sheet and one of the chord edge portions 121 of the edge-cut lens barrel 12 are located at the first side edge 33101 of the base main body 331. The other of the chord edges 1141 of the edge-cut lens sheet and the other of the chord edge portions 121 of the edge-cut lens barrel 12 are located at the third side edge 33103 of the base main body 331.

Figure 29:
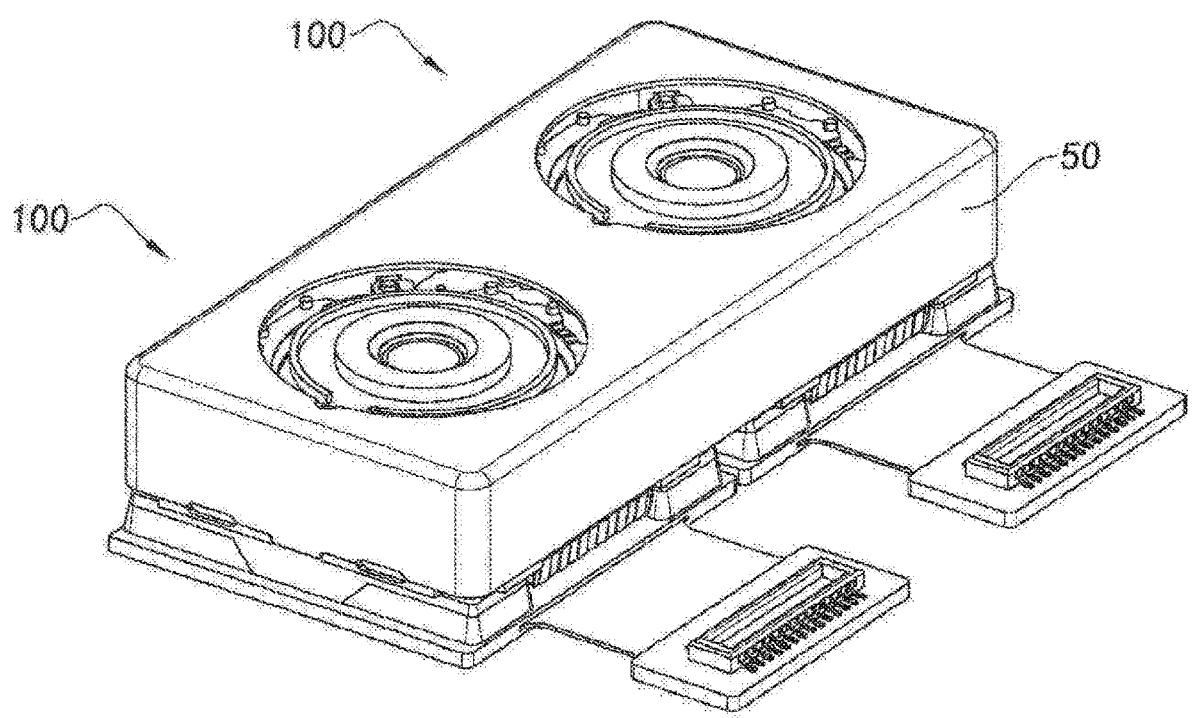
FIG. 29 is a schematic view of an array camera module in accordance with the fifteenth preferred embodiment of the present invention.

FIG. 29 is a schematic view of an array camera module in accordance with the fifteenth preferred embodiment of the present invention.

In this implementation, the array camera module includes a plurality of the camera modules 100 so that the modules cooperate with each other. In particular, each of the camera modules 100 is separately disposed, that is, the circuit board 32 and the base 33 of each of the camera modules 100 may not be connected.

Further, each of the camera modules 100 may be assembled by an outer frame 50.

Further, in some embodiments, the array camera module may be formed by the camera module 100 of the present invention and a conventional camera module, that is, the array camera module includes at least one camera module 100.

Figure 30:
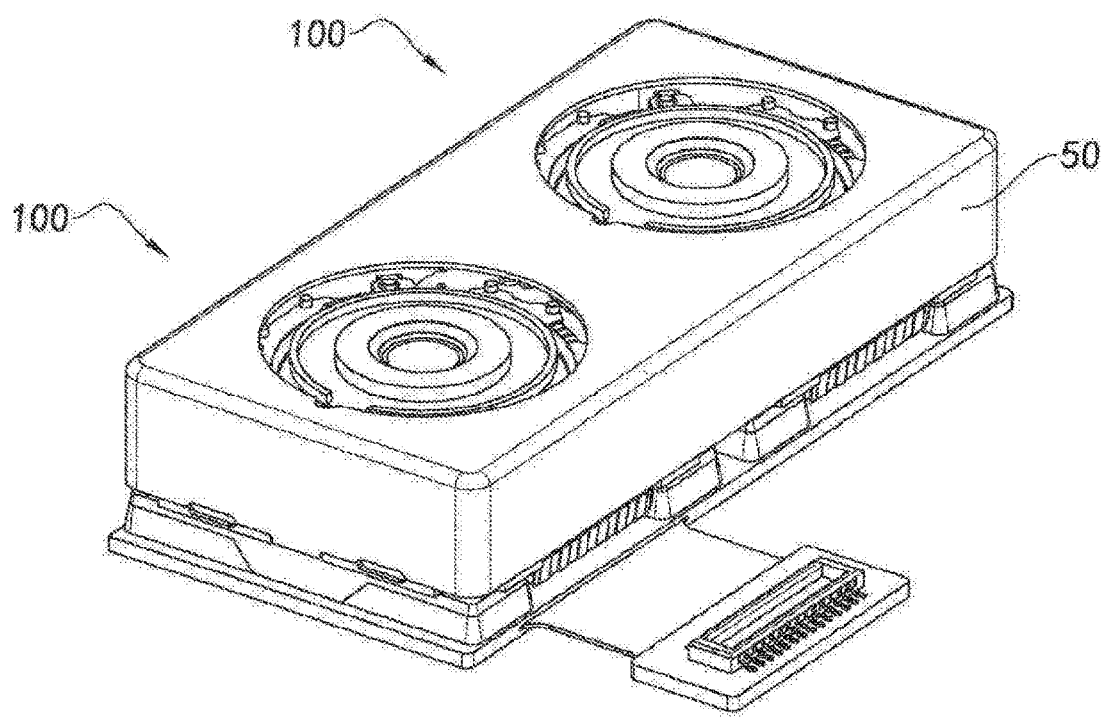
FIG. 30 is a schematic view of an array camera module in accordance with the sixteenth preferred embodiment of the present invention.

FIG. 30 is a schematic view of an array camera module in accordance with the sixteenth preferred embodiment of the present invention.

In this implementation, the array camera module 100 includes a plurality of camera modules 100 so that the modules cooperate with each other. In particular, each of the camera modules 100 is disposed in an interconnected manner, that is, the circuit board 32 and the base 33 of each of the camera modules 100 may be connected to each other to form an integral structure.

Further, in some embodiments, the array camera module may be formed by a combination of the camera module 100 of the present invention and a conventional camera module, that is, the array camera module includes at least one camera module 100. At least one of the camera modules 100 may be interconnected with a conventional camera module to form the array camera module.

Figure 31:
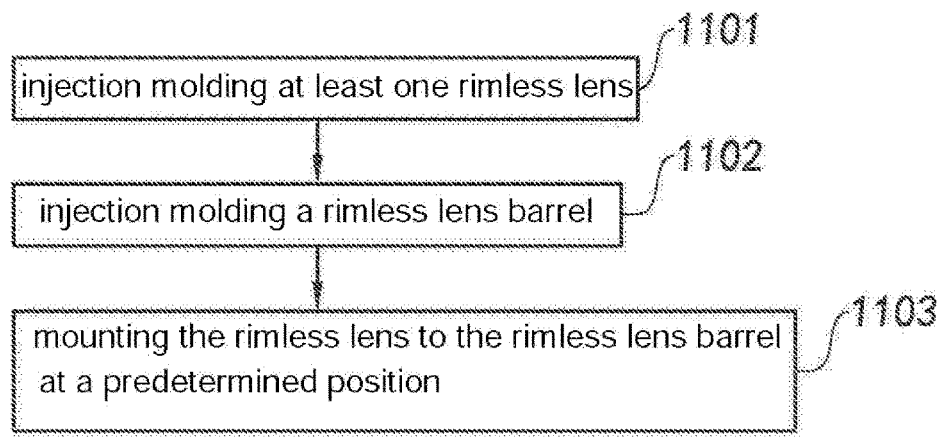
FIG. 31 is a schematic view showing a method of manufacturing the lens in accordance with the above-mentioned preferred embodiments of the present invention.

FIG. 31 is a schematic view showing a method of manufacturing the lens 10 in accordance with the above-mentioned preferred embodiments of the present invention. The present invention provides a method 1000 of manufacturing a lens 10, the method comprising steps of:

1101: injection molding at least one edge-cut lens sheet;

1102: injection molding an edge-cut lens barrel 12; and

1103: mounting the edge-cut lens sheet to the edge-cut lens barrel 12 at a predetermined position.

Figure 32:
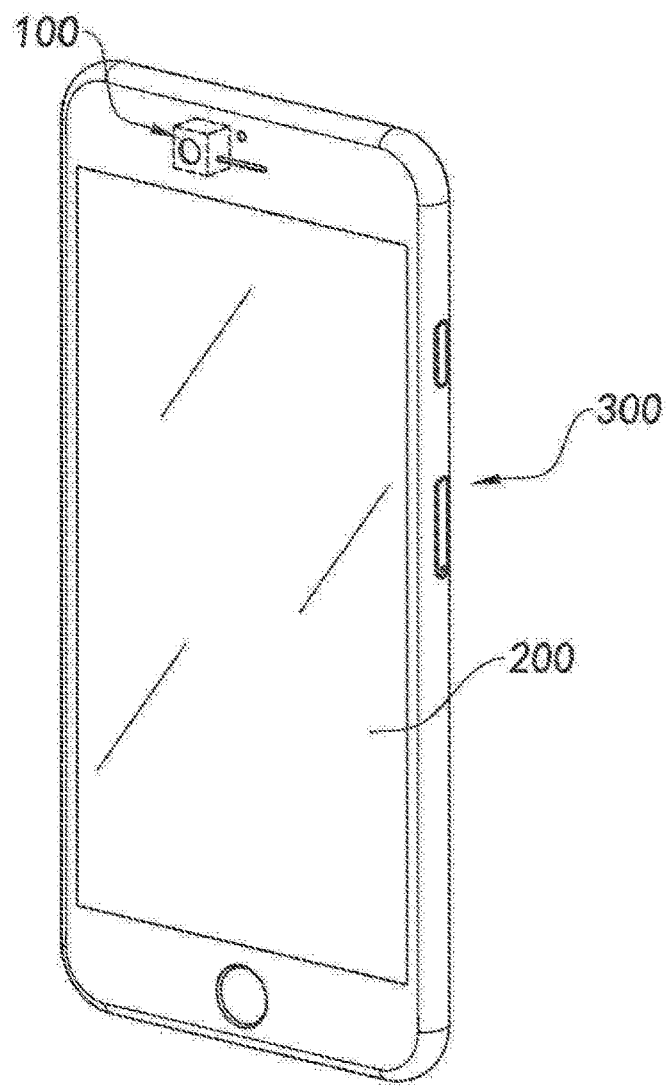
FIG. 32 is a schematic view of an application of the camera module in accordance with the above-mentioned preferred embodiments of the present invention.

FIG. 32 is a schematic view of an application of the camera module 100 in accordance with the above-mentioned preferred embodiments of the present invention.

The present invention further provides an electronic device 300, wherein the electronic device includes an electronic device body 200 and at least one camera module 100, and wherein the camera module 100 is disposed on the electronic device body 200 for acquiring an image. It is worth mentioning that the type of the electronic device body 200 is not limited. For example, the electronic device body 200 may be a smart phone, a wearable device, a tablet computer, a notebook computer, an e-book, a personal digital assistant, a camera, a monitor apparatus or any electronic device that can be equipped with the camera module 100. It should be understood by those skilled in the art that although the electronic device body 200 is implemented as a smart phone in FIG. 32, it does not constitute a limitation to the content and scope of the present invention.

It should be understood by those skilled in the art that the embodiments of the present invention described in the above description and the accompanying drawings are only exemplary and not limiting to the present invention. The objects of the present invention have been achieved completely and efficiently. The function and structural principles of the present invention have been shown and described in the embodiments, and the embodiments of the present invention may be varied or modified without departing from the principles.

The invention claimed is:

1. A camera module, comprising:

a lens, wherein the lens includes at least one edge-cut lens sheet, wherein the edge-cut lens sheet has at least one chord edge and at least one circular edge, and the chord edge and the circular side are adjacent, wherein the curvature of the chord edge and the curvature of the circular edge are different; and a photosensitive assembly, wherein the lens disposed on the photosensitive assembly and is located on a photosensitive path of the photosensitive assembly parallel to a direction of an optical axis, and the photosensitive assembly includes a photosensitive chip, a circuit board and a molded base, wherein the photosensitive chip is electrically connected to the circuit board, and the molded base is disposed on the circuit board;

wherein the circuit board has an elongated shape, and the chord edge of the edge-cut lens sheet extends along a direction parallel to a short axis of the circuit board and perpendicular to a long axis of the circuit board, and the chord edge of the edge-cut lens sheet is located in an extension direction of the long axis of the circuit board.

2. The camera module according to claim 1, wherein the photosensitive assembly further includes at least one electronic element, and the electronic element is integrally enclosed by the molded base and is located at a side of the molded base, wherein an extension direction of the side of molded base is perpendicular to the chord edge of the edge-cut lens sheet.

3. The camera module according to claim 1, wherein the photosensitive assembly further includes at least one electrical connection element, and the photosensitive chip is electrically connected to the circuit board via the electrical connection element, wherein the electrical connection element is located at a side of the molded base, and an extension direction of the side of molded base is perpendicular to the chord edge of the edge-cut lens sheet.

4. The camera module according to claim 1, wherein the circuit board has a circuit board main body, and the circuit board main body is extending in the extension direction of the long axis of the circuit board.

5. The camera module according to claim 4, wherein the circuit board main body has a first board body and a second board body, and the second board body is connected to and extends from the first board body along the extension direction of the long axis of the circuit board.

6. The camera module according to claim 5, wherein the first board body has a connection side and an opposite side opposite to the connection side, wherein the connection side of the first board body is connected to the second board body.

7. The camera module according to claim 6, wherein the chord edge of the edge-cut lens sheet is located adjacent to the connection side of the first board body when view from the direction of the optical axis, and the chord edge of the edge-cut lens sheet is adjacent to the second board body.

8. The camera module according to claim 6, wherein the chord edge of the edge-cut lens sheet is located adjacent to the opposite side of the first board body when view from the direction of the optical axis, and the chord edge of the edge-cut lens sheet is away from the second board body.

9. The camera module according to claim 6, wherein the first board body further has two wing sides extending between the connection side and the opposite side of the first board body;

wherein an extension direction of the short axis of the circuit board is perpendicular to the extension direction of the long axis of the circuit board, and a connecting line of the two wing sides is parallel to the extension direction of the short axis of the circuit board.

10. The camera module according to claim 9, wherein the photosensitive assembly further includes at least one electronic element integrally enclosed by the molded base, and the electronic element is located on at least one of the two wing sides of the circuit board.

11. The camera module according to claim 9, wherein the photosensitive assembly further includes at least one electrical connection element electrically connected to the photosensitive chip and the circuit board, and the electrical connection element is located on at least one of the two wing sides of the circuit board.

12. The camera module according to claim 5, wherein the first board body and the second board body are integrally formed.

13. The camera module according to claim 5, wherein the first board body and the second board body are fixedly connected by a connecting medium.

14. The camera module according to claim 1, wherein the extension direction of the long axis of the circuit board is perpendicular to the direction of the optical axis.

15. The camera module according to claim 14, wherein the circuit board has two wing sides, and a connecting line of the two wing sides is perpendicular to the extension direction of the long axis of the circuit board and also perpendicular to the direction of the optical axis;
wherein the photosensitive assembly further includes at least one electronic element integrally enclosed by the molded base, and the electronic element is located on at least one of the two wing sides of the circuit board.

16. The camera module according to claim 15, wherein the photosensitive assembly further includes at least one electrical connection element electrically connected to the photosensitive chip and the circuit board, and the electrical connection element is located on at least one of the two wing sides of the circuit board.

17. The camera module according to claim 16, wherein the electrical connection element is not overlapping with the molded base in the direction of the optical axis.

18. The camera module according to claim 16, wherein the photosensitive assembly further includes a plurality of electronic elements and a plurality of electrical connection elements, and the electronic elements and the electrical connection elements are arranged along each wing side of the circuit board.

19. The camera module according to claim 1, wherein the photosensitive chip is disposed on the circuit board, and the molded base surrounds the photosensitive chip, wherein the photosensitive chip does not overlap with the molded base in the direction of the optical axis.

20. The camera module according to claim 1, wherein the chord edge has a curvature of zero and is a straight-line segment, and the circular edge is a circular arc.

* * * * *